(12) United States Patent
Song

(10) Patent No.: US 7,221,562 B2
(45) Date of Patent: May 22, 2007

(54) PORTABLE COMPUTER

(75) Inventor: Young-shin Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 120 days.

(21) Appl. No.: 10/934,447

(22) Filed: Sep. 7, 2004

(65) Prior Publication Data

US 2005/0083644 A1    Apr. 21, 2005

(30) Foreign Application Priority Data

Oct. 16, 2003    (KR)    ............... 10-2003-0072309

(51) Int. Cl.
G06F 1/16    (2006.01)
(52) U.S. Cl. .................... 361/681; 361/683; 312/223.2
(58) Field of Classification Search ........ 361/679–683;
312/223.1–223.3
See application file for complete search history.

(56) References Cited

U.S. PATENT DOCUMENTS 6,266,236 B1 *    7/2001    Ku et al. ................... 361/681
6,366,440 B1 *    4/2002    Kung ......................... 361/147
6,532,147 B1 *    3/2003    Christ, Jr. .................. 361/683
6,972,947 B2 *    12/2005    Duncan ...................... 361/683
2004/0165342 A1 *    8/2004    Chang ........................ 361/681

FOREIGN PATENT DOCUMENTS

| CN | 1074542 A | 7/1993 |
| CN | 1182275 A | 5/1998 |
| KR | 1995-25655 | 9/1995 |
| KR | 1998-020131 | 7/1998 |
| KR | 2000-0000642 | 1/2000 |
| KR | 2001-111727 | 12/2001 |

* cited by examiner

Primary Examiner—Yean-Hsi Chang
(74) Attorney, Agent, or Firm—Roylance, Abrams, Berdo & Goodman L.L.P.

(57) ABSTRACT

The present invention relates to a portable computer comprising a main body having a processing unit; a display comprising a display housing including a display surface on which information is displayed according to the processing unit; a link connecting the main body and the display, the display surface being able to be rotated to be substantially parallel with and facing the main body in a first position, to be substantially parallel with and facing away from the main body in a second position, and be substantially non-parallel with the main body in a third position.

18 Claims, 23 Drawing Sheets

PORTABLE COMPUTER

CROSS-REFERENCE TO RELATED APPLICATION

This application claims priority under 35 U.S.C. § 119(a) to Korean Patent Application No. 2003-72309, filed on Oct. 16, 2003 in the Korean Intellectual Property Office, the entire disclosure of which is incorporated herein by reference.

BACKGROUND OF THE INVENTION

1. Field of the Invention

The present invention relates to a portable computer. More particularly, the present invention relates to a portable computer that is convenient to open and close a display with respect to a computer main body.

2. Description of the Related Art

Typically, a portable computer includes a main body, a display rotatably connected to the main body having a liquid crystal display (LCD) panel at the front thereof, a locking member preventing the display from being unintentionally unfolded and a button for operating the locking member. As an example of the locking member, Korean utility model Publication No. 2000-0642 discloses a locking member comprising a metal plate mounted on an upper surface of a housing, a magnet slidably mounted on a display panel for attachment to the metal plate via the magnetic force and a button engaging the magnet. Thus, to unfold the display folded onto the housing, a user should hold the button and slide the magnet and hold the display. Only thereafter, the user can unfold the display.

As described above, to open the conventional portable computer, the magnet should be slid by the button and then the metal plate and the magnetic button should be separated to hold the display. Thus, it may be inconvenient for the user to open and close the portable computer.

Thus, for the user's convenience, a locking member which can easily prevent the display from unintentionally being rotated about the computer main body and with which the display is conveniently unfolded without any additional operating means such as the button is required.

SUMMARY OF THE INVENTION

Accordingly, it is an aspect of the present invention to provide a portable computer with a display that is convenient to open and close with respect to the computer main body.

Additional aspects and advantages of the invention will be set forth in the description which follows.

The foregoing and other aspects of the present invention are also achieved by providing a portable computer comprising a main body having a processing unit; a display comprising a display housing including a display surface on which information is displayed according to the processing unit; a link connecting the main body and the display, the display surface being able to be rotated to be substantially parallel with and facing the main body in a first position, to be substantially parallel with and facing away from the main body in a second position, and be substantially non-parallel with the main body in a third position; and a locking member for preventing the display from unintentionally being rotated in the first position or in the second position, the locking member comprising a first metal member mounted on a front surface of the display, a second metal member mounted on a rear surface of the display and a magnet provided on the main body to be attached to the first metal member by the magnetic force in the first position and to be attached to the second metal member by the magnetic force in the second position.

According to another aspect of the invention, the link comprises a first element connected to the main body in the first position, and a pair of second elements rotatably connected to the first element and rotatably connected to the display housing in the second position.

According to still another aspect of the invention, the portable computer further comprises an accommodating part grooved from an upper surface of the main body to accommodate the magnet; a pair of side supporters for supporting opposite sides of the magnet and having a height higher than the side height of the magnet; a front supporter for supporting the front of the magnet; and a rear supporter for supporting the rear of the magnet.

The foregoing and other aspects of the present invention are also achieved by providing a portable computer comprising a main body having a processing unit; a display comprising a display housing including a display surface on which information is displayed according to the processing unit; a link for connecting the main body and the display, the display surface being able to be rotated to be substantially parallel with and facing the main body in a first position, to be substantially parallel with and facing away from the main body in a second position, and be substantially non-parallel with the main body in a third position; a locking member for preventing the display from unintentionally being rotated in the first position or in the second position, the locking member comprising a first magnet mounted on a front surface of the display, a second magnet mounted on a rear surface of the display and a metal member provided on the main body to be attached to the first magnet by the magnetic force of the magnet in the first position and to be attached to the second magnet by the magnetic force of the magnet in the second position.

According to an aspect of the invention, the portable computer further comprises a first accommodating part grooved from an upper surface of the main body to accommodate the first magnet; a pair of first side supporters for supporting opposite sides of the first magnet and having a height higher than the side height of the first magnet; a first front supporter for supporting the front of the first magnet; a first rear supporter for supporting the rear of the first magnet; a second accommodating part grooved from a rear surface of the main body to accommodate the second magnet; a pair of second side supporters supporting opposite sides of the second magnet and having the height higher than the side height of the second magnet; a second front supporter supporting the front of the second magnet; and a second rear supporter for supporting the rear of the second magnet.

According to another aspect of the invention, the portable computer further comprises a connector for connecting the pair of side supporters to the main body to allow the pair of side supporters to move relative to the accommodating part.

According to still another aspect of the invention, the pair of side supporters comprises a first side supporter comprising a first side supporting part provided at a first side of the magnet and contacting the magnet; and a first side connecting part having a width shorter than that of the first side supporting part and extending downwardly from the first side supporting part; and a second side supporter comprising a second side supporting part provided at a second side of the magnet and contacting the magnet; and a second side connecting part having the width shorter than that of the second side supporting part and extending downwardly from the second side supporting part.

According to yet another aspect of the invention, the accommodating part is formed with a first inserting groove in which the first side connecting part is inserted to be in communication with the main body and a second inserting groove in which the second side connecting part is inserted to be in communication with the main body.

According to another aspect of the invention, the portable computer further comprises first, second, and third anchoring parts aligned with one another in the accommodating and placed in a lower part of the main body with a predetermined space therebetween, the first connecting part inserted in the second inserting groove being interposed between the second and third anchoring parts and the second connecting part inserted in the first inserting groove being interposed between the second and third anchoring parts.

According to still another aspect of the invention, the connector further comprises first, second and third anchoring part holes passing through the first, second, and third anchoring parts, respectively; first and second side connecting part holes passing through the first and second connecting parts, respectively; and pins inserted in the first, second and third anchoring part holes and first and second side connecting part holes.

The foregoing and or other aspects of the present invention are also achieved by providing a portable computer comprising a main body; a display rotatably connected with the main body; and a locking member for preventing the display from unintentionally being rotated in a folded position in which a front surface of the display is substantially parallel with and in contact with the main body, the locking member comprising a metal member provided at one end of the display and the main body and a magnet provided at the other end of the display and the main body for attachment to the metal member due to the magnetic force.

BRIEF DESCRIPTION OF THE DRAWINGS

These and other aspects and advantages of the present invention will become apparent and more readily appreciated from the following description of several embodiments of the invention, taken in conjunction with the accompanying drawings of which.

In the accompanying drawings, it should be understood that like reference numerals refer to like elements throughout.

DETAILED DESCRIPTION OF THE PREFERRED EMBODIMENTS

Figure 1:
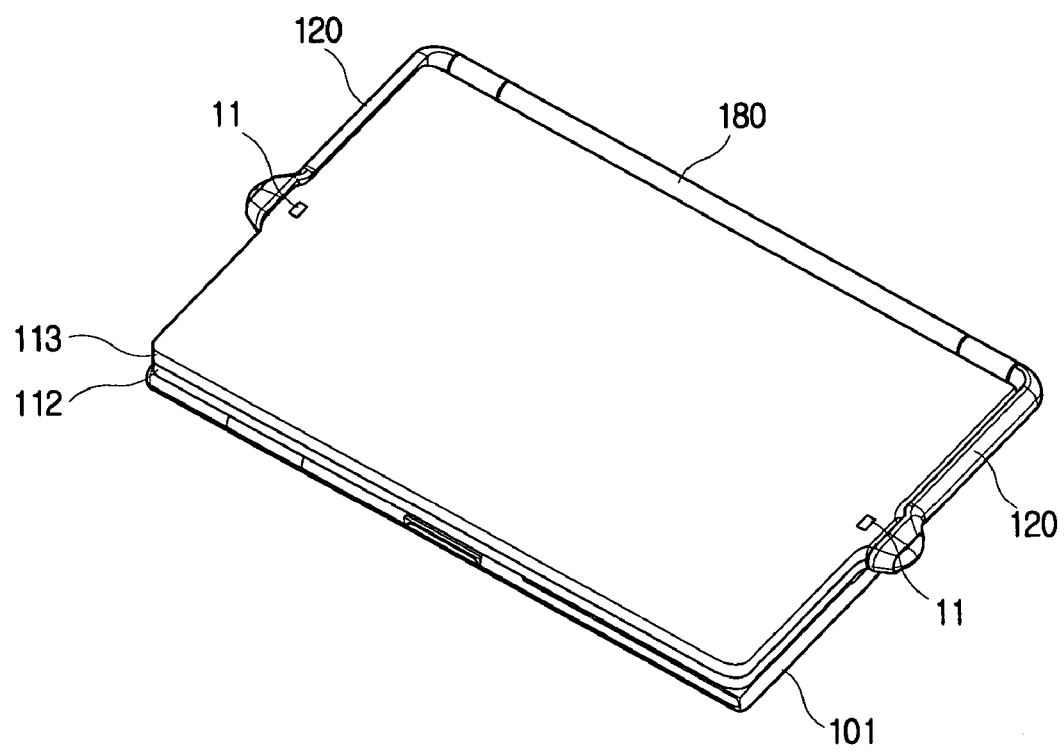
FIG. 1 is a perspective view illustrating a folded state of a portable computer according to a first embodiment of the present invention.

Reference will now be made in detail to certain embodiments of the present invention, examples of which are illustrated. The embodiments are described below in order to explain the present invention by referring to the figures.

Referring to FIGS. 1 through 9, a portable computer according to a first embodiment of the present invention comprises a main body 101 provided with a plurality of components, a display 110 for displaying a picture thereon by receiving a video signal from the main body 101, and a pair of arm links 120 having a first end rotatably connected to the main body 101 and a second end rotatably connected to the display 120.

The main body 101 is internally provided with a main board (not shown) including a central processing unit (CPU), a graphic chip (not shown) and the like and is externally provided with an input unit such as a keyboard 103, a mouse or the like. Therefore, when a user inputs data through the input unit, the data is transmitted from the main body 101 to the display 110 through a cable 105 (see FIG. 6) electrically connecting the main body 101 with the display 110, and is then displayed as a picture on a liquid crystal display (LCD) panel 111 of the display 110. While described in terms of the LCD, it should be understood that other types of displays can be used, including but not limited to, plasma display panels (PDPs), cathode ray tubes (CRTs), flat panel displays, and other such devices.

The display 110 has a touch-screen function, which allows a user to do tablet operations with an input device such as a stylus pen (not shown). The display 110 enables the LCD panel 111 to display a picture thereon by receiving the video signal from the main body 101, and front and rear covers 112 and 113 that are combined to each other to supply the LCD panel 111. A connecting link 180 (see FIG. 5) is provided in the back of the display 110 to connect the pair of arm links to each other.

One of the pair of arm links 120 connects a first side of the display 110 with the main body 101 and the other of the pair of arm links 120 connects a second side of the display 110 with the main body 101. A display hinge is provided between a first end of each of the arm links 120 and the display 110. A main body hinge is provided between a second end of each of the arm links 120 and the connecting link 180.

Figure 6:
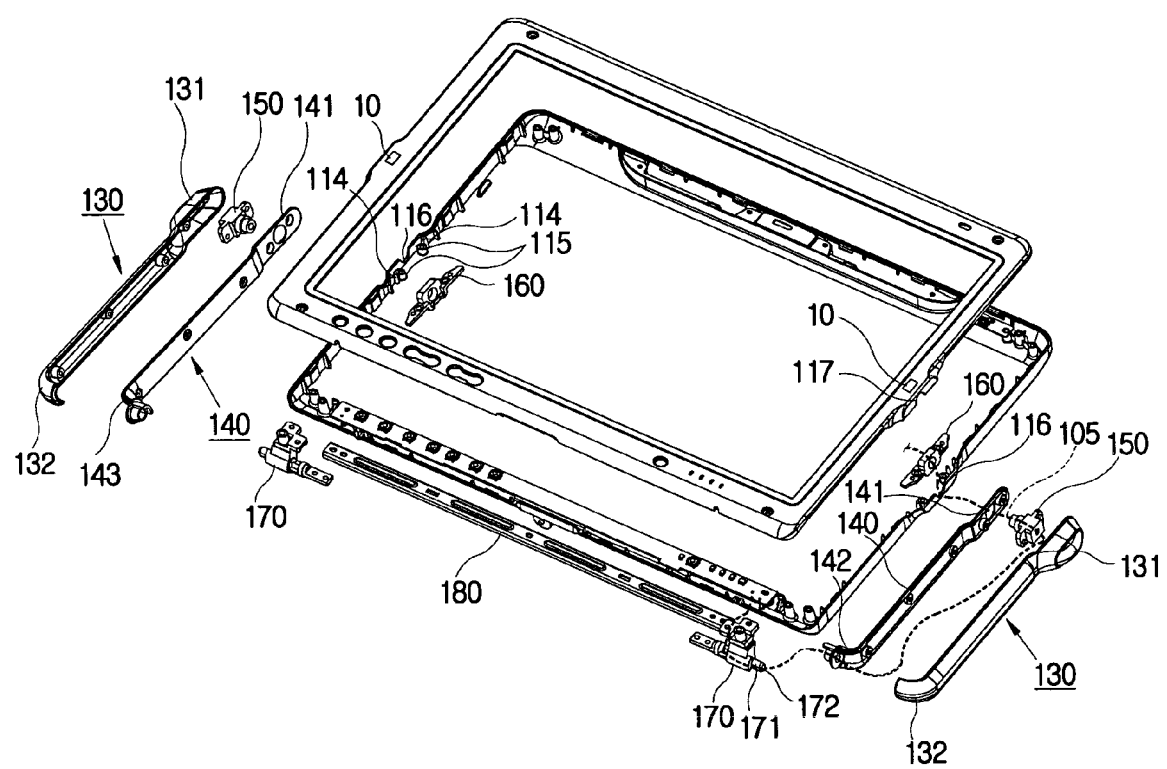
Figure 7:
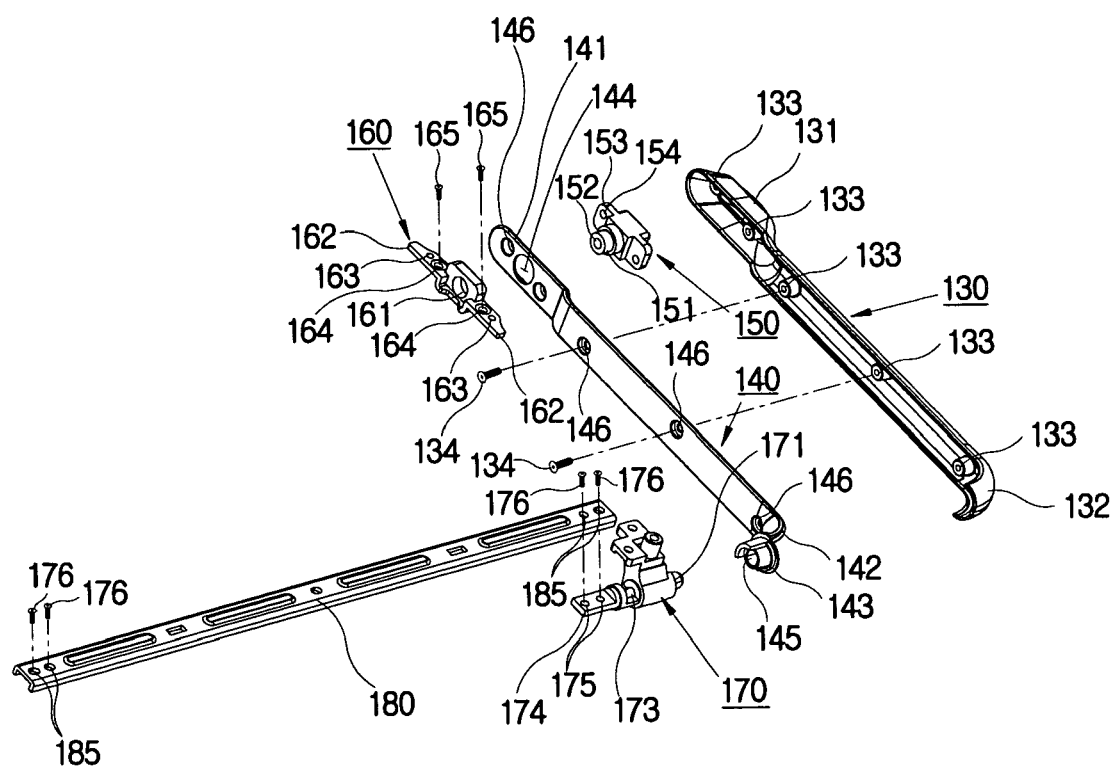
FIG. 7 is an enlarged perspective view of some components of the display in FIG. 6.

As shown in FIGS. 6 and 7, the arm link 120 allows the display 110 to be adjusted to a completely folded position (refer to FIG. 1) in which the front cover 112 of the display 110 is in contact with the keyboard 103 of the main body 101, an unfolded position (refer to FIGS. 2 and 3) in which the display 110 is approximately perpendicular relative to the main body 101, and a tablet operation position (refer to FIG. 9) in which the rear cover 113 of the display 110 is completely turned upside on the main body 101 such that the LCD panel 111 faces away from the main body 101.

The arm link 120 comprises an outer cover 130 forming an outer enclosure and an inner cover 140 combined to the outer cover 130 to form a cable passage for the cable 105 therein.

The outer cover 130 has a first end 131 protruding outward and a second end 132 curved inward. Inside the outer cover 130 is formed a plurality of bosses 133 at predetermined intervals along a lengthwise direction of the outer cover 130. Each boss 133 has a screw thread for combining with a corresponding first screw 134 that passes through a corresponding through hole 146 of the inner cover 140.

The inner cover 140 has a first end 141 and a second end 142. The first end 141 is bent outward to correspond with the first end 131 of the outer cover 130. The second end 142 is curved inward to correspond with the second end 132 of the outer cover 130.

The first end 141 of the inner cover 140 is formed with a first hinge hole 144 into which a first hinge shaft 151 of a first shaft member 150 is rotatably inserted. The second end 142 of the inner cover 140 is formed with an extended part 143 having a second hinge hole 145 into which a second hinge shaft 171 of a second shaft member 170 is rotatably inserted. The inner cover 140 is formed with the plurality of through holes 146 at positions corresponding to the bosses 133 of the outer cover 130 to pass a threaded part of the first screw 134 there-through.

The display hinge comprises the first hinge hole 144 of the inner cover 140, the first shaft member 150 including a first hinge shaft 151 rotatably inserted in the first hinge hole 144 and a first shaft supporting bracket 160 that is combined with the rear cover 113 and supports the first shaft member 150 when the first hinge shaft 151 passes through the first hinge hole 144.

The first shaft member 150 is accommodated in a space formed between the first end 141 of the inner cover 140 and the first end 131 of the outer cover 130. The first shaft member 150 comprises the first hinge shaft 151 protruding toward the rear cover 113 to be rotatably inserted in the first hinge hole 144 of the inner cover 140, a first cable through hole 152 formed along a protruding direction of the first hinge shaft 151 for passing the cable 105 through the first shaft member 150. The first shaft member 150 further includes a pair of flanges 153 extending in opposite directions of the first hinge shaft 151 for fastening between the first end 141 of the inner cover 140 and the first end 131 of the outer cover 130.

Each flange 153 is formed with a through hole 154 to be aligned with the through hole 146 formed on the first end 141 of the inner cover 140 and the boss 133 formed on the first end of the outer cover 130. Thus, the threaded part of the pair of first screws 134 among the plurality of first screws 134 for combining the inner cover 140 with the outer cover 130 is sequentially inserted in the through hole 146 formed on the first end 141 of the inner cover 140, the through hole 154 formed on the flange 153 of the first shaft member 150, and the boss part 133 formed on the first end 131 of the outer cover 130. Thus, the first end 141 of the inner cover 140, the first shaft member 150 and the first end 131 of the outer cover 130 are combined with one another.

The first shaft supporting bracket 160 comprises a first hinge shaft hole 161 aligned with the first hinge hole 144 to accommodate and support the first hinge shaft 151 of the first shaft member 150 when the first hinge shaft 151 passes though the first hinge hole 144. The first shaft supporting bracket 160 further includes a pair of wings 162 extending in opposite directions of the first shaft supporting bracket 160. On each wing 162 is formed a projection groove 163 in which a projection 114 of the rear cover 113 is inserted and a through hole 164 through which a second screw 165 passes and combines with a screw hole 115 formed on the rear cover 113.

The main body hinge includes the second hinge hole 145 formed on the extended part 143 of the second end 142 of the inner cover 140 and the pair of second shaft members 170 provided between the second end 132 of the arm links 120 and the connecting link 180.

The second shaft member 170 comprises the second hinge shaft 171 to be rotatably inserted in the second hinge hole 145 formed on the extended part 143 of the inner cover 140 and an insertion part 174 extending in an opposite direction of the second hinge shaft 171 and fitted into a groove of the connecting link 180.

The second hinge shaft 171 is rotatably inserted in the second hinge hole 145 formed on the extended part 143 of the inner cover 140 and formed with a second cable through hole 172 formed along an insertion direction along which the second hinge shaft 171 is inserted into the second hinge hole 145. The second hinge hole 145 is in communication with the cable passage formed between the inner cover 140 and the outer cover 130 of the arm link 120. Thus, the cable 105 sequentially passes through the first cable through hole 152 of the first hinge shaft 151, the cable passage in the arm link 120, and the second cable through hole 172 of the second hinge shaft 171.

The insertion part 174 protrudes from the second shaft member 170 in a direction opposite to the second hinge shaft 171. The respective insertion parts 174 are combined to opposite ends of the connecting link 180 having the groove. That is, the insertion part 174 of the second shaft member 170 is inserted in the groove of the connecting link 180 at a corresponding end of the connecting link 180, with the screw holes 175 being aligned with the through holes 185 of the connecting link 180. Then, the insertion parts 174 are fastened to the connecting link 180 by third screws 176.

Between the insertion part 174 and the second hinge shaft 171 is formed an opening 173 at an upper side thereof and which is in communication with the second cable through hole 172. Therefore, the cable 105, which sequentially passes through the first cable through hole 152 of the first hinge shaft 151, the cable passage inside the arm link 120 and the second cable through hole 172 of the second hinge shaft 171 in sequence, and is drawn out through the opening 173 communicating with the second cable through hole 172, and then connected to a printed circuit board (PCB) provided on the rear cover 113.

Figure 2:
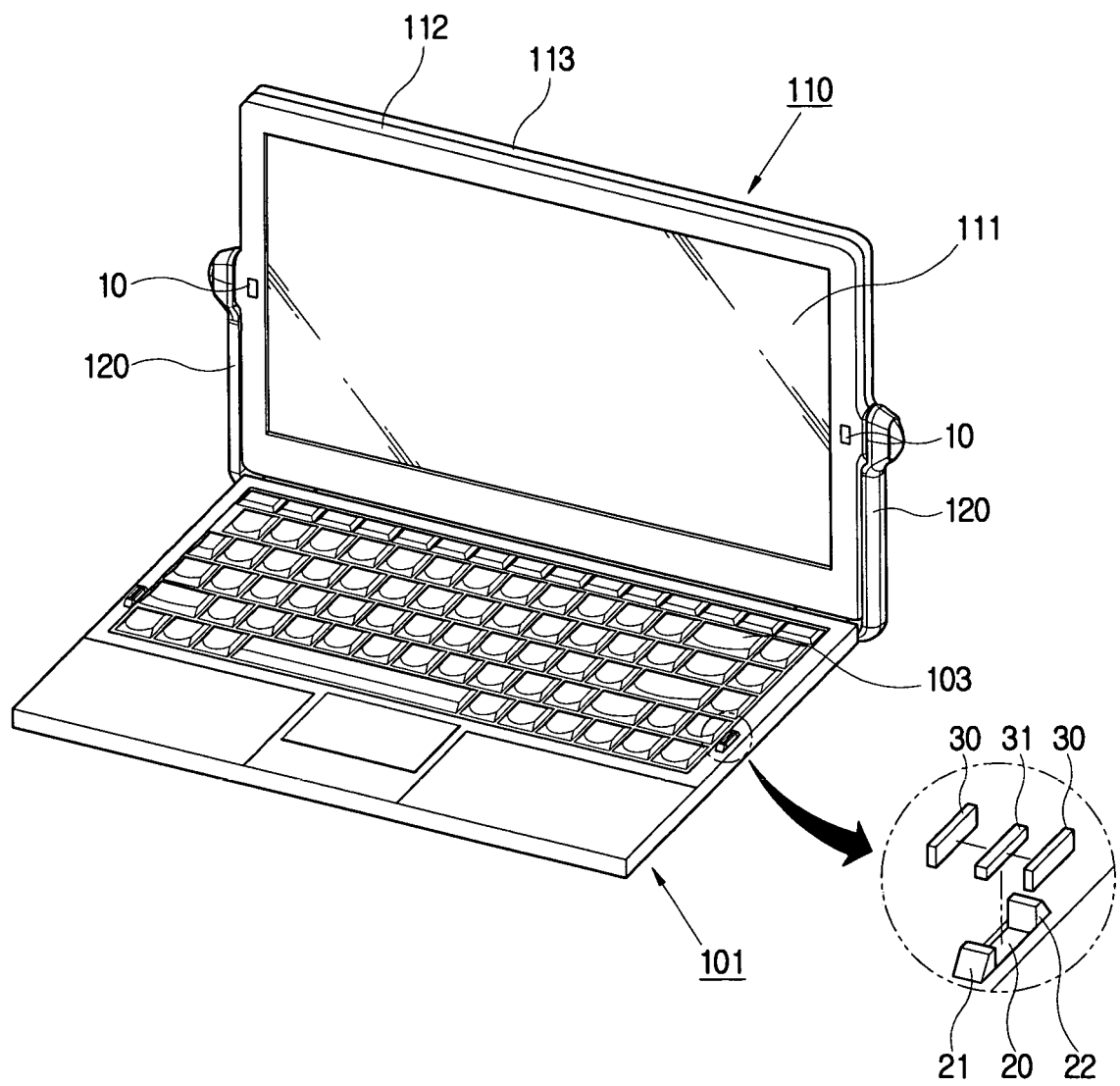
FIGS. 2 and 3 are perspective views illustrating an unfolded state of the portable computer of FIG. 1.
Figure 3:
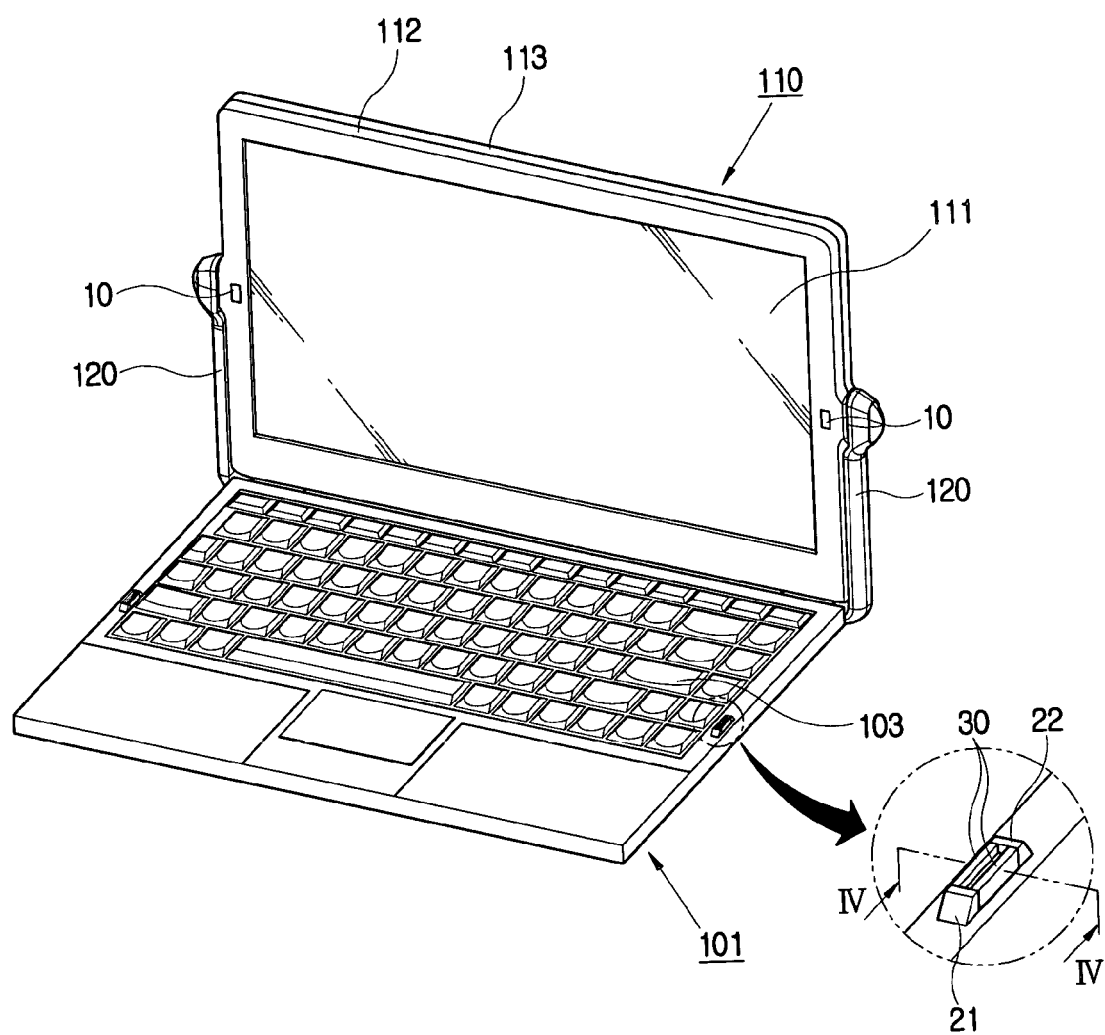

The portable computer according to the first embodiment of the present invention further comprises a locking member. The locking member prevents the display 110 from unintentionally rotating and being unfolded as shown in FIGS. 2 and 3, when the display 110 is in the completely folded position (refer to FIG. 1) in which the front cover 112 of the display 110 is substantially parallel with and in contact with the upper surface of the main body 101 including the keyboard 103. Further, the locking member prevents the display 110 from unintentionally rotating, when the display 110 is in the tablet operation position (refer to FIG. 9) in which the rear cover 113 of the display 110 is substantially parallel with and in contact with the upper surface of the main body 101 having the keyboard 103 and the LCD panel 111 of the display 110 is exposed to the outside.

Figure 9:
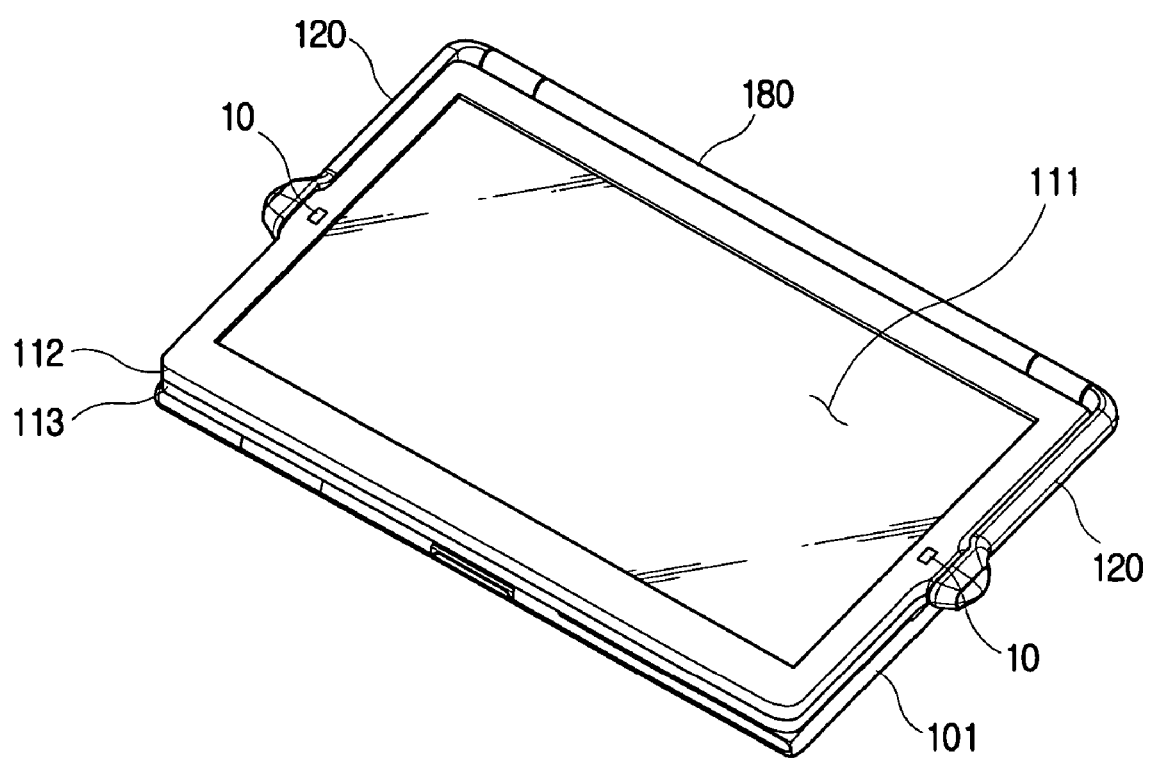

As shown in FIGS. 1 through 4, the locking member comprises a first metal member 10 mounted on the front cover 112 of the display 110, a second metal member 11 mounted on the rear cover 113 of the display 110 and a magnet 31 accommodated in an accommodating part 20 for attachment to the first metal member 10 with a magnetic force in the folded position (refer to FIG. 1) and for attachment to the second metal member 11 with the magnetic force in the tablet operation position (refer to FIG. 9).

As shown in FIGS. 2 and 3, the accommodating part 20 is grooved from an upper surface of the computer main body 101 to form an upper opening, which forms an accommodating space for the magnet 31.

A pair of side supporters 30 is mounted on opposite sides of the accommodating part 20 with a predetermined space therebetween. A front supporter 21 and a rear supporter 22 are mounted on the front and rear of the accommodating part 20 with a predetermined space therebetween.

Figure 4:
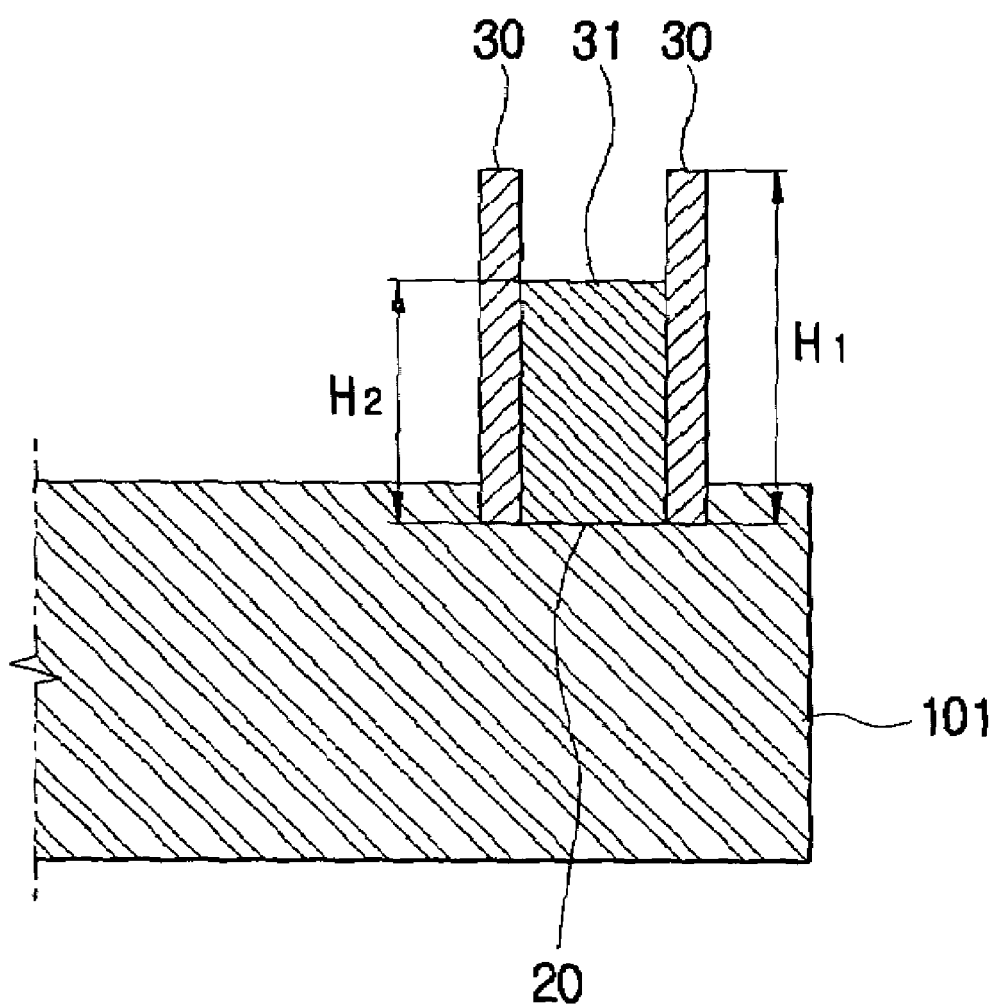
FIG. 4 is a schematic sectional view taken along line IV—IV of FIG. 3.

As shown in FIG. 4, the pair of side supporters 30 is of a shape of a plate having the height H1 higher than the side height $H_2$ of the magnet 31. Thus, the pair of side supporters 30 can completely cover side surfaces of the magnet 31, which prevents a floppy disc or a card from being demagnetized when the magnet 31 is in contact with the floppy disc or the card.

Between the pair of side supporters 30 is the magnet 31 arranged so that the pair of side supporters 30 supports the opposite sides of the magnet 31.

The front and rear supporters 21 and 22 protrude upwardly from an upper surface of the computer main body 101. Between the front and rear supporters 21 and 22 is the magnet 31 which supports the front and rear of the magnet 31. The locking member as described above may provide the greatest magnetic force.

Figure 5:
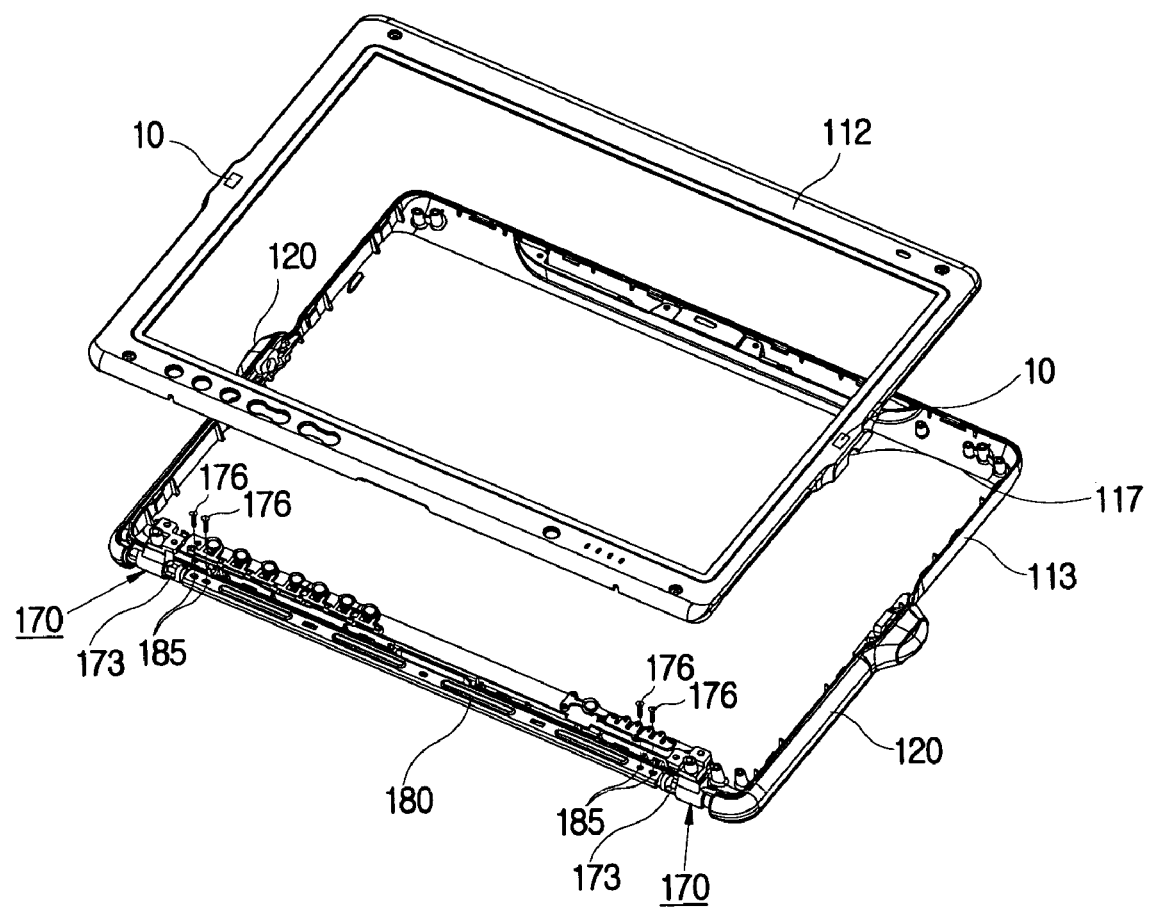
FIGS. 5 and 6 are exploded perspective views of the display of the portable computer according to the first embodiment of the present invention shown in FIG. 3.

With this configuration, with reference to FIGS. 5 through 7, the above-described components of the portable computer according to the first embodiment are assembled as follows.

The inner covet 140 and the outer cover 130 are combined in the state that the first hinge shaft 151 of the first shaft member 150 is inserted in the first hinge hole 144 formed on the first end 141 of the inner cover 140 of the arm link 120, so that the first shaft member 150 is accommodated in the space formed between the first end 141 of the inner cover 140 and the first end 131 of the outer cover 130.

Here, when the first shaft member 150 is accommodated in the space between the first end 141 of the inner cover 140 and the first end 131 of the outer cover 130, the inner cover 140 and the outer cover 130 are fastened by inserting the threaded part of the first screw 134 through the through hole 146 of the inner cover 140 into the boss part 133 of the outer cover 130.

After the respective arm links 120 are assembled, the pair of arm links 120 each having the first hinge shaft 151 exposed to the outside through the first hinge hole 144 of the inner cover 140 is combined to the opposites sides of the rear cover 113, respectively.

Here, the first hinge shaft 151 exposed to the outside through the first hinge hole 144 of the arm link 120 is inserted in the first hinge shaft hole 161 of the first shaft supporting bracket 160. The projection 114 of the rear cover 113 is inserted in the projection groove 163 formed on the wing 162 of the first shaft supporting bracket 160, and the second screw 165 passes through the through hole 164 of the wing 162 and is inserted in the screw hole 115 of the rear cover 113. Specifically, when the pair of arm links 120 is combined to the opposite sides of the rear cover 113, the first hinge shaft 151 is inserted in the first hinge shaft hole 161 of the first shaft supporting bracket 160, being hung on a first supporting groove 116 of the rear cover 113. Here, the first supporting groove 116 has a semicircular shape, and contacts a semicircular second supporting groove 117 of the front cover 112, thereby forming a circular hole to rotatably accommodate the first hinge shaft 151 therein together with the first hinge shaft hole 161.

After the arm link 120 and the display hinge are combined, the second hinge shaft 171 of the second shaft member 170 is inserted in the second hinge hole 145 formed on the extended part 143 of the inner cover 140, and the insertion part 174 of the second shaft member 170 is fitted into the groove of the connecting link 180 at the end of the connecting link 180. The insertion part 174 of the second shaft member 170 and the end of the connecting link 180 are fastened by inserting the third screws 176 into the screw holes 175 through the through holes 185 being aligned with the screw holes 175. It should be understood that an assemblage of the above-described components is not limited to the foregoing assembling order and other arrangements and orders can be used and still fall within the scope of the present invention.

The portable computer according to the first embodiment of the present invention is operated relative to the display 110 as follows.

As shown in FIG. 1, initially, the front cover 112 of the display 110 is substantially parallel with and in contact with the upper surface of the main body 101 including the keyboard 103. That is, the display 110 is completely folded onto the main body 101, with the first metal member 10 of the front cover 112 being attached to the magnet 31 of the computer main body 101 with the magnetic force of the magnet 31. In this state, if a user holds the display 110 and rotates the display 110 upwardly to make the display 110 away from the upper surface of the computer main body 101, the display 110 rotates with respect to the main body hinge, so that the display 110 is positioned approximately perpendicular to the upper surface of the computer main body 101 to be unfolded, as shown in FIGS. 2 and 3. Then, the user can use the portable computer by inputting data with the keyboard 103.

Here, as shown in FIG. 6, the cable 105 to electrically connect the main body 101 with the display part 110 is disposed, passing through the first cable through hole 152 of the first hinge shaft 151, the cable passage inside the arm link 120, and the second cable through hole 172 of the second hinge shaft 171 in sequence, and being drawn out through the opening 173 communicating with the second cable through hole 172 so as to be connected to the PCB mounted to the rear cover 113.

In the portable computer as shown in FIG. 1, when the user wants to perform a tablet operation while moving, the user can turn the display 110 to the tablet operation position in which the rear cover 13 of the display 110 is in contact with the keyboard 103 on the upper surface of the computer main body 101 and the LCD panel 111 of the display 110 is exposed to the user (refer to FIG. 9).

Figure 8:
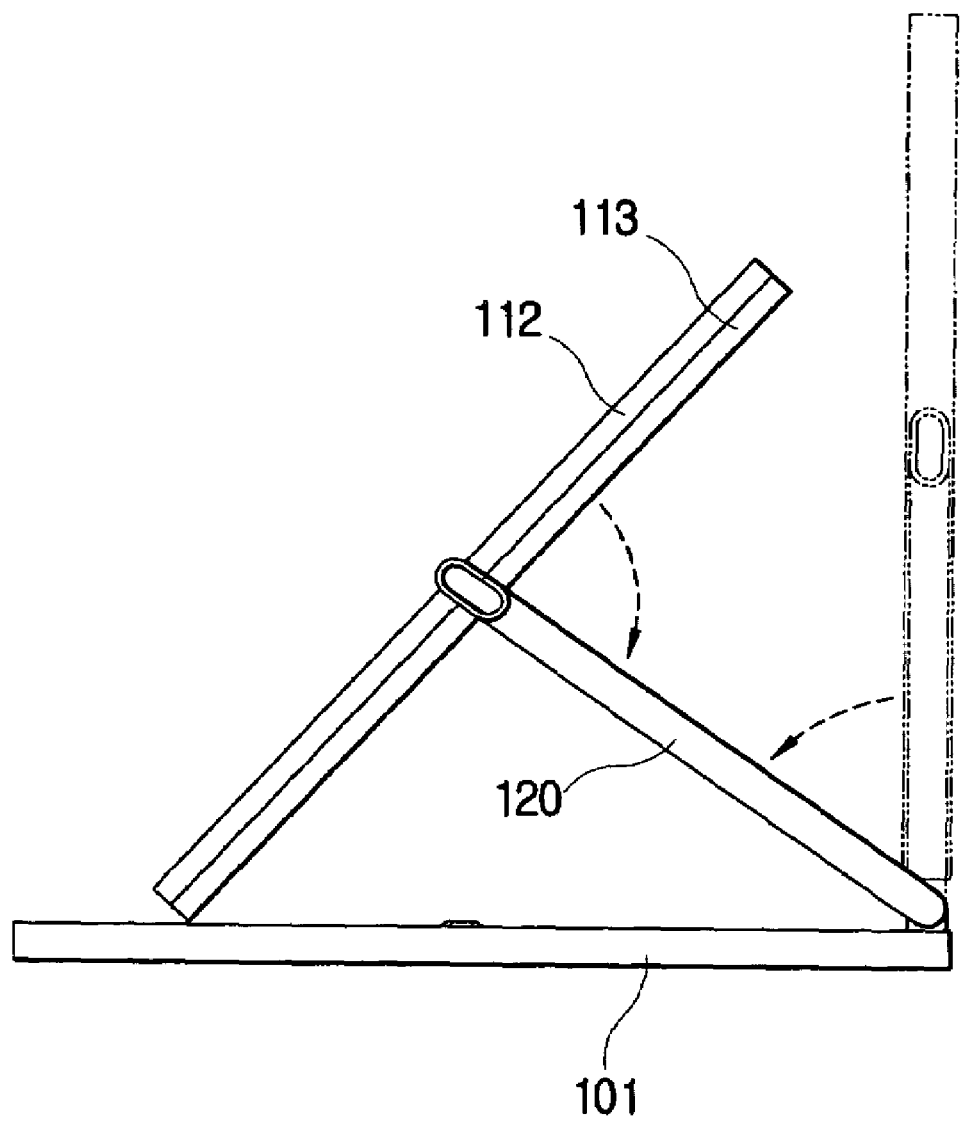
FIGS. 8 and 9 illustrate operations of the portable computer according to the first embodiment of the present invention.

If the user holds the display 110 and pulls up a lower part of the display 110 toward the user, as shown in FIG. 8, the display 110 rotates about both the display hinge and the main body hinge and the lower part of the display 110 is mounted on the computer main body 101, forming an inclined angle between the display 110 and the upper surface of main body 101. Here, if the user further pulls the lower part of the display 110 toward the user, the display 110 rotates about both the display hinge and the main body hinge, and the display 110 is adjusted to the tablet operation position shown in FIG. 9 at which the rear cover 13 of the display 110 is substantially parallel with and in contact with the upper surface of the computer main body 101 having the key board and LCD panel 111 is exposed to the user. Here, the magnet 31 is attached to the second metal member 11 of the rear cover 113 of the display 110 due to the magnetic force.

Thus, while moving, the user can use the portable computer in the table operation position (refer to FIG. 9) by gripping the portable computer with one hand and gripping a stylus pen with another hand, wherein the display 110 of the portable computer is completely folded onto the main body 101, exposing the LCD panel 111 to the outside. However, when the display 110 is in the tablet operation shown in FIG. 9, the portable computer may also be used on a table.

Further, because of torque generated when the first shaft member 150 rotates inside the first hinge hole 144 or when the second shaft member 171 rotates inside the second hinge hole 145, the display 110 can be kept at a predetermined angle relative to the main body 101 as shown in FIG. 8 as long as a user does not apply a force to the display 110. Therefore, a user can adjust the display 110 to a variety of angles as desired.

Figure 10:
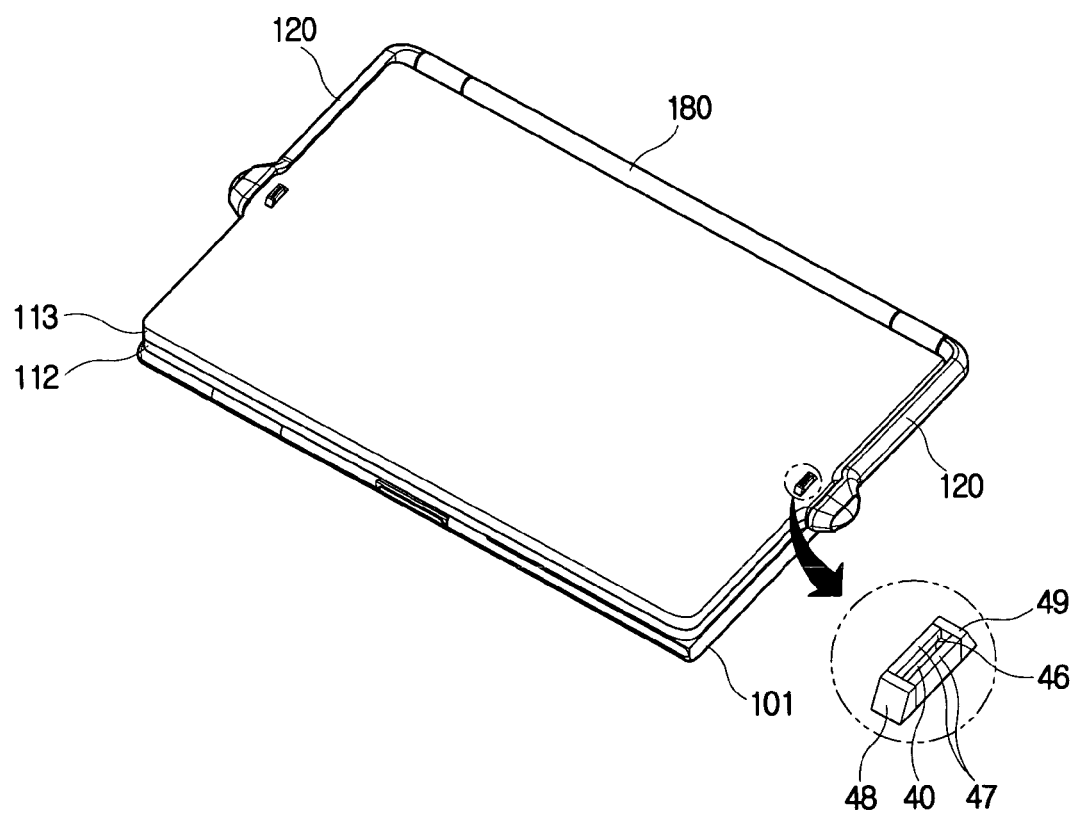
FIG. 10 is a perspective view illustrating a folded state of a portable computer according to a second embodiment of the present invention.
Figure 11:
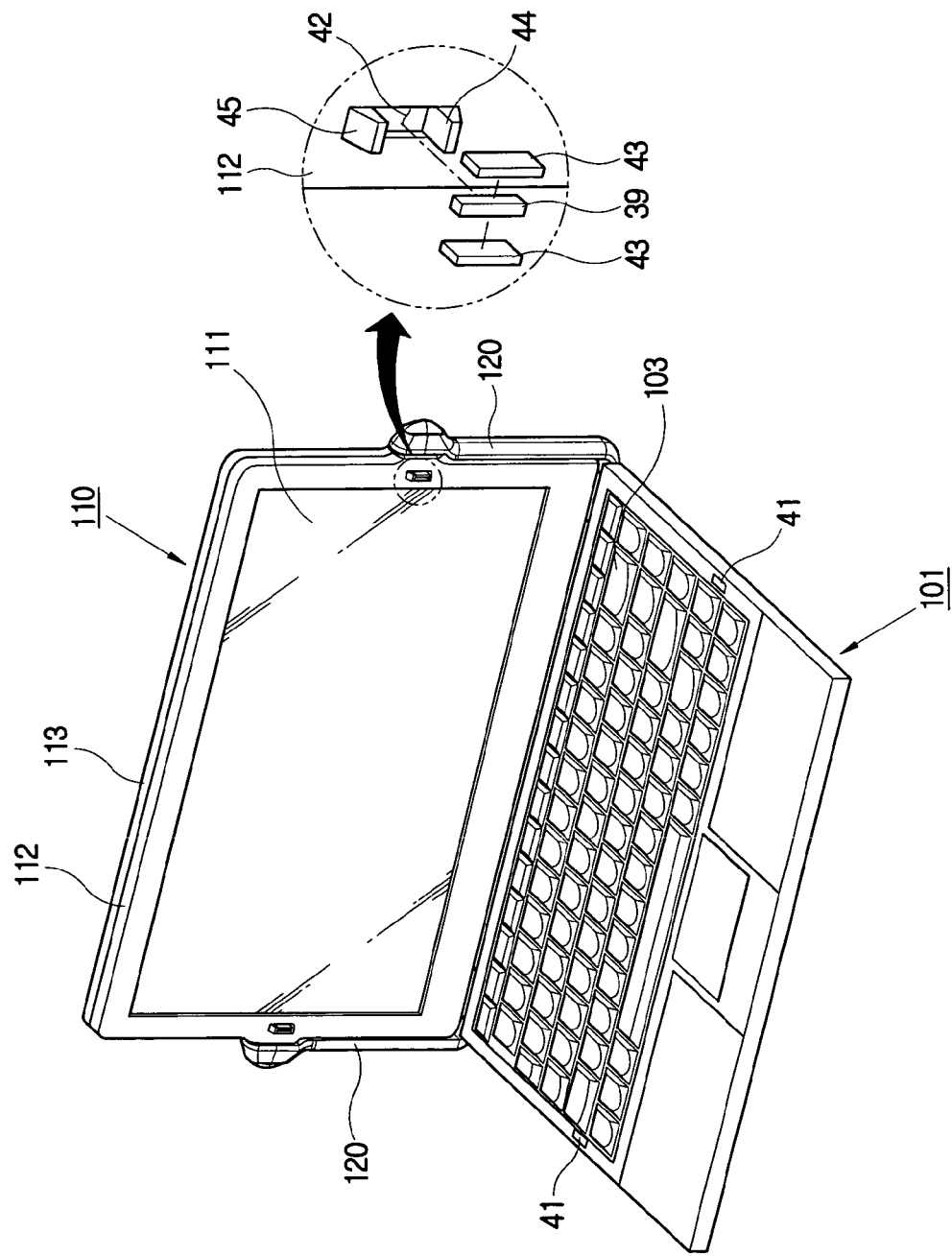
FIG. 11 is a perspective view illustrating an unfolded state of the portable computer in FIG. 10.
Figure 12:
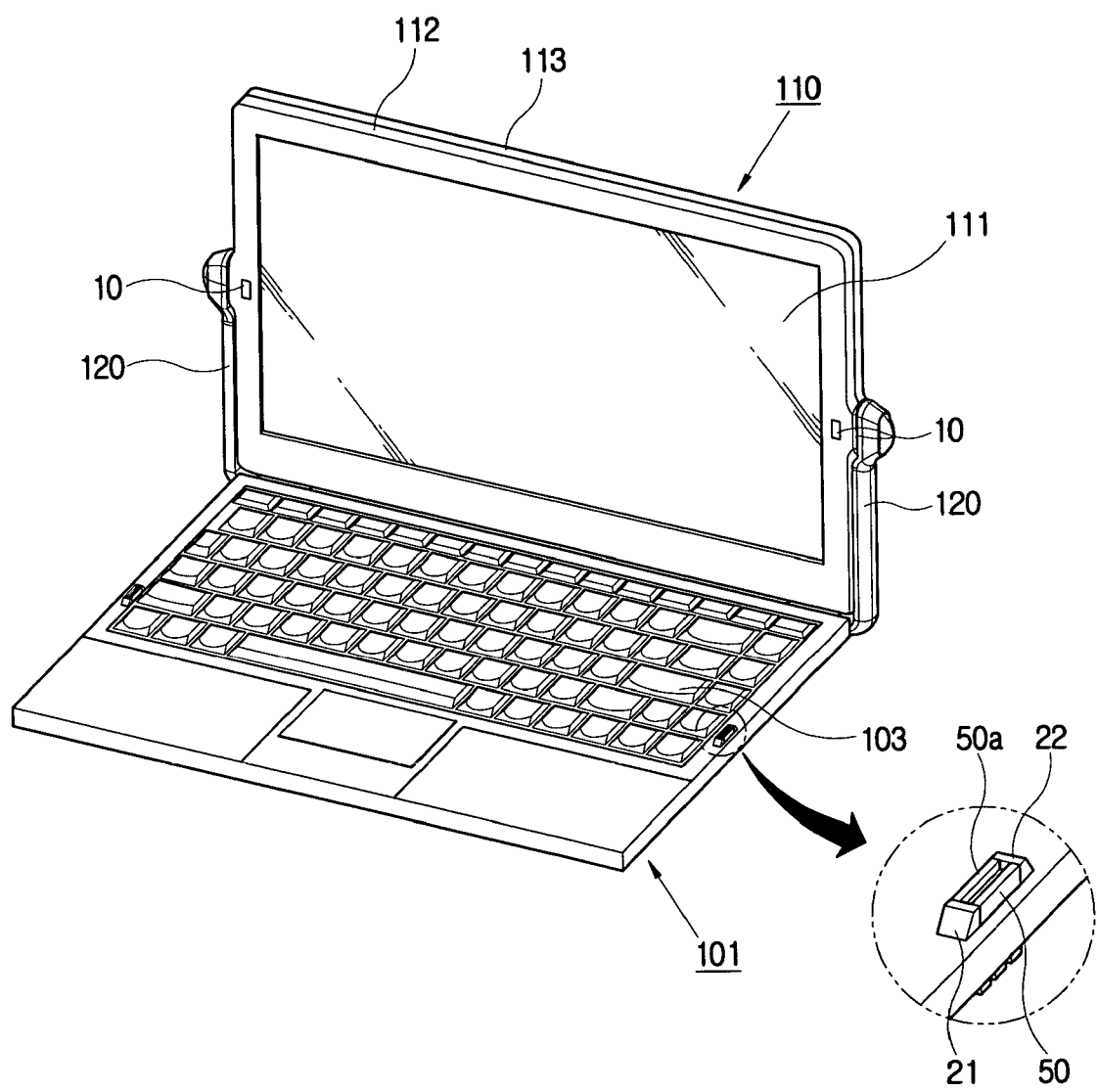
FIG. 12 is a perspective view illustrating a folded state of a portable computer according to a third embodiment of the present invention.

The present invention provides a second embodiment. That is, as shown in FIGS. 10 and 11, according to the second embodiment of the present invention, a first magnet 39 is provided on the front cover 112 of the display 110, a second magnet 40 is provided on the rear cover 113 of the display 110 and a metal member 41 is provided on the computer main body 101.

Thus, the first magnet 39 is accommodated in a first accommodating part 42 provided on the front cover 112 of the display 110 and the second magnet 40 is accommodated in a second accommodating part 46 provided on the rear cover 113 of the display 110.

A pair of first side supporters 43 is mounted on opposite sides of the first accommodating part 42 on the front cover 112 of the display 110 and a pair of second side supporters 47 is mounted on opposite sides of the first accommodating part 46 on the front cover 112 of the display 110.

A first front supporter 44 and a first rear supporter 45 are mounted at the front and the rear of the first accommodating part 42 on the front cover 112 of the display 110, respectively, and a second front supporter 48 and a second rear supporter 49 are mounted at the front and the rear of the second accommodating part 46 on the front cover 112 of the display 110, respectively.

Figure 13:
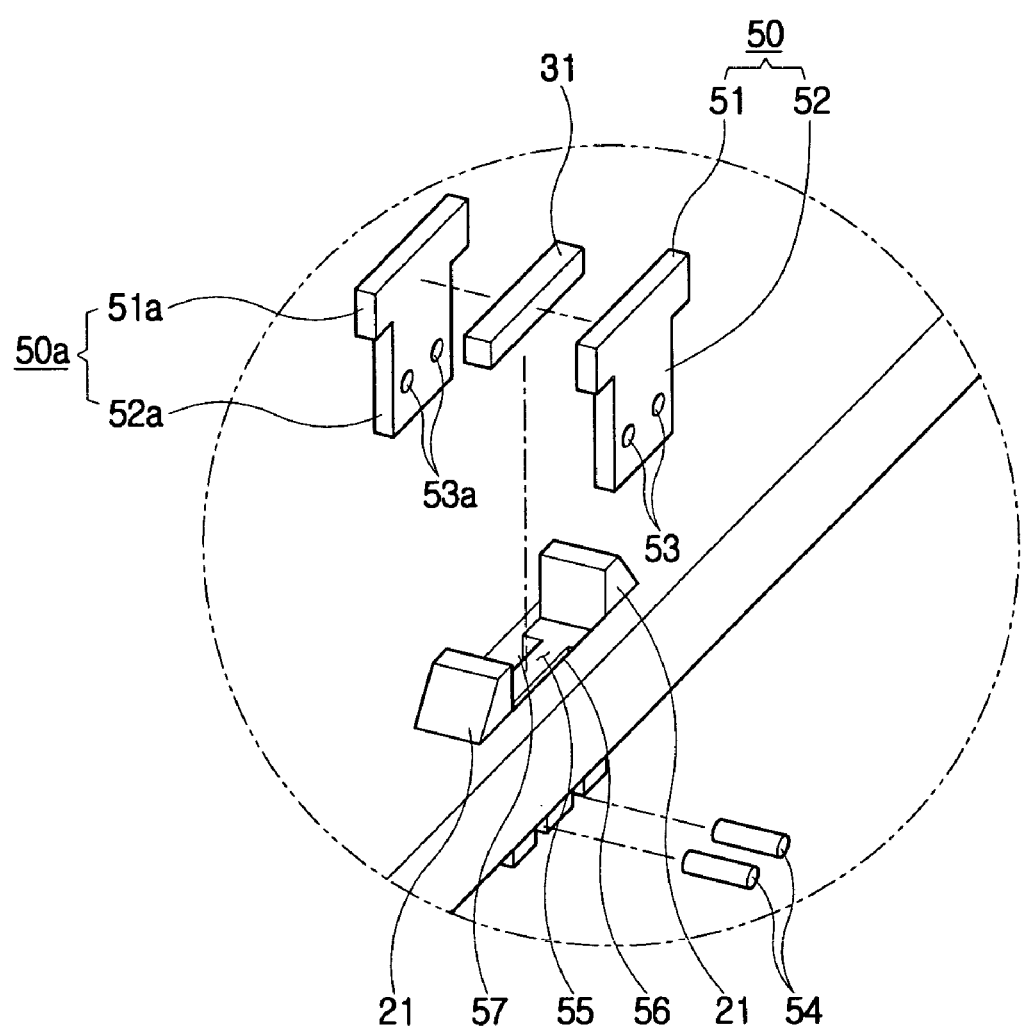
FIGS. 13 and 14 are enlarged perspective views of a locking member in FIG. 12.

Further, the present invention provides a third embodiment shown in FIGS. 12 through 16B in which side supporters are movable. As shown in FIG. 13, according to the third embodiment of the present invention, a left side supporter 50 and a right side supporter 50a are mounted on opposite sides of an accommodating part 55.

The right side supporter 50 comprises a right side supporting part 51 that is in contact with a side of the magnet 31 to support the magnet 31 and a right side connecting part 52 having the width shorter than that of the right side supporting part 50 and extending downwardly from the right side supporting part 51.

The left side supporter 50a comprises a left side supporting part 51a having the same shape of the right side supporting part 51 and being in contact with the other side of the magnet 31 to support the magnet 31 and a left side connecting part 52a having the width shorter than that of the left side supporting part 51a and extending downwardly from the left side supporting part 51a.

The right side connecting part 52 is formed with a pair of right side connecting part holes 53 on a surface thereof. The left side connecting part 52a is formed with a pair of left side connecting part holes 53a aligned with the right side connecting part holes 53 on a surface thereof. A pair of pins 54 is inserted in the right and left side connecting part holes 53 and 53a.

The right side connecting part 52 of the right side supporter 50 is inserted into a first inserting groove 56 (to be described later) and then interposed between first and second anchoring parts 61 and 63 (to be described later). The left side connecting part 52a of the left side connecting part 50a is inserted into a second inserting groove 57 (to be described later) and then interposed between second and third anchoring parts 63 and 65 (to be described later).

As shown in FIG. 13, the accommodating part 55 is formed with the first and second inserting grooves 56 and 57 that are apart from each other and pass through the computer main body 101 to be in communication with an interior of the accommodating part 55. At a lower part of the computer main body 101 are formed the first, second and third anchoring parts 61, 63 and 65 aligned with one another in the accommodating part 55 to be connected with the right side connecting part 52 and the left side connecting part 52a, respectively, when the right side connecting part 52 is inserted in the first inserting groove 56 and the left side connecting part 52a is inserted in the second inserting groove 57.

Figure 14:
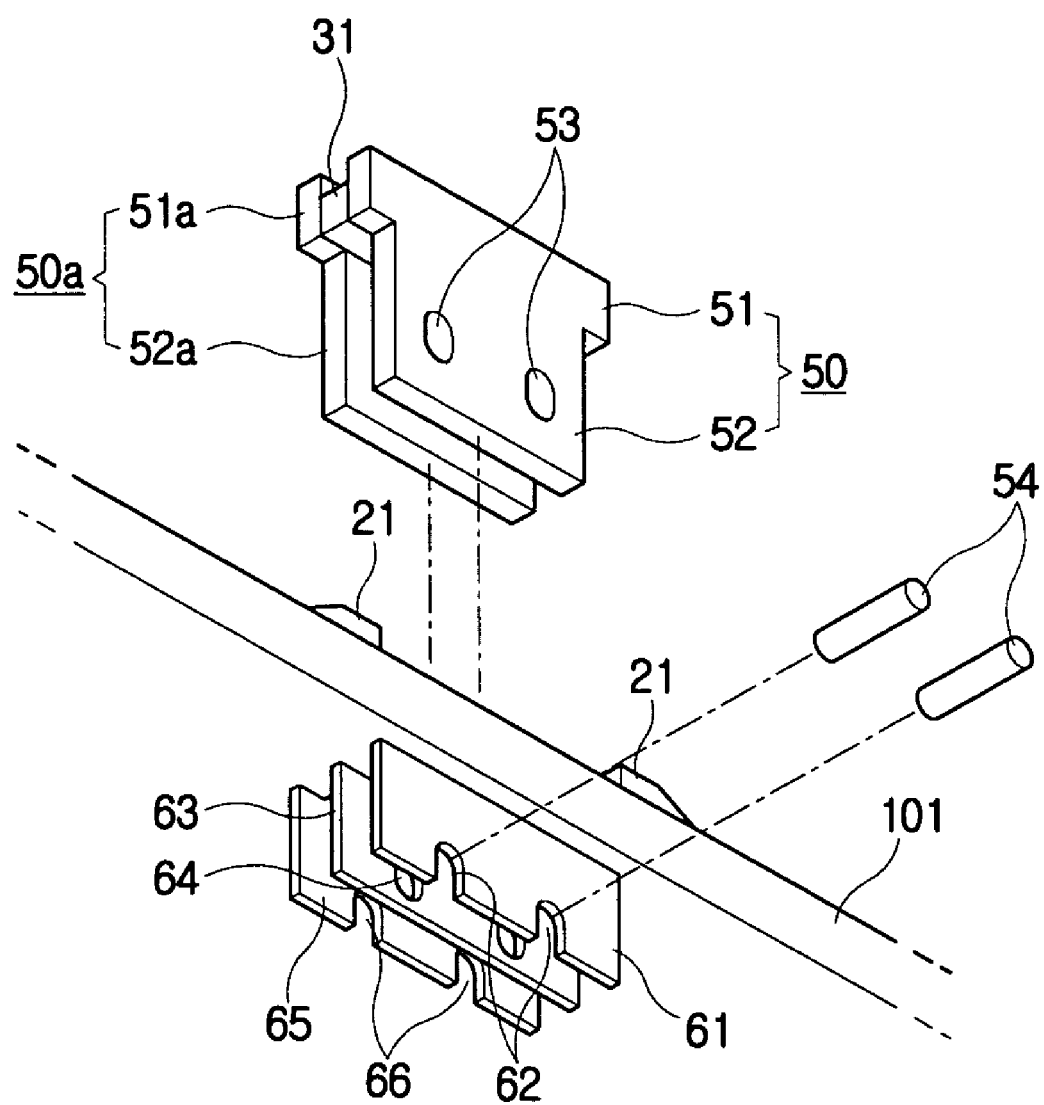

As shown in FIG. 14, each of the first, second and third anchoring parts 61, 63 and 65 is placed apart from one another with a predetermined space in a lower part of the computer main body 101. The right side connecting part 52 of the right side supporter 50 is inserted in the first inserting groove 56 and interposed between the first and second anchoring parts 61 and 63. The left side connecting part 52a of the left side supporter 50a is inserted in the second inserting groove 57 and interposed between the second and third anchoring parts 63 and 65.

The first, second and third anchoring parts 61, 63 and 65 are formed with a first, second and third anchoring part hole 62, 64 and 66, respectively, aligned with the right side connecting part hole 53 and the left side connecting part hole 53a, which allows the pins 54 to be inserted into surfaces of the first, second and third anchoring parts 61, 63 and 65 in a traverse direction thereof. Thus, the pins 54 are sequentially inserted in the first anchoring part hole 62, the right side connecting part hole 53, the second anchoring part hole 54, the left side connecting part hole 53a and the third anchoring part hole 66.

According to the first embodiment of the present invention, the pair of side supporters 30 is securely accommodated in the accommodating part 20, so that the pair of side supporters 30 cannot be moved. However, as shown in FIGS. 15A through 16B, the right and left side supporters 50 and 50a according to the third embodiment of the present invention are movably accommodated in the accommodating part 55, which provides a convenience to insert the magnet 31 between the right and left side supporters 50 and 50a.

Figure 15A:
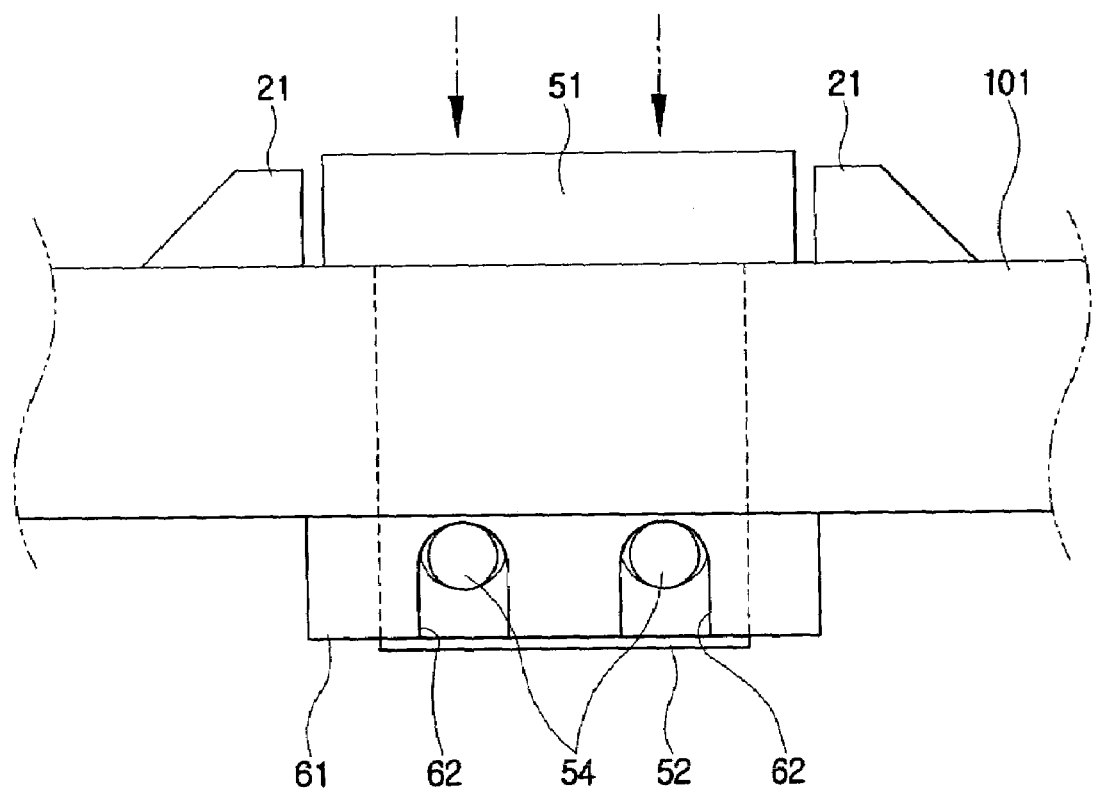
FIGS. 15A and 15B show how side supporters shown in FIG. 14 are moved in a vertical direction.
Figure 15B:
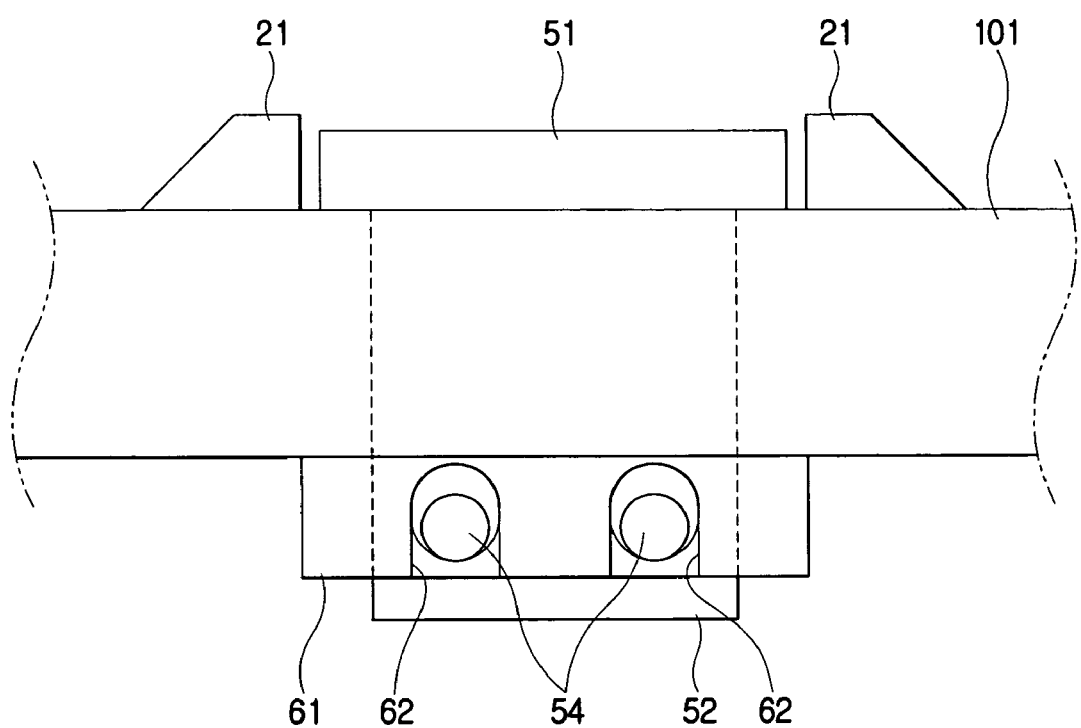
Figure 16A:
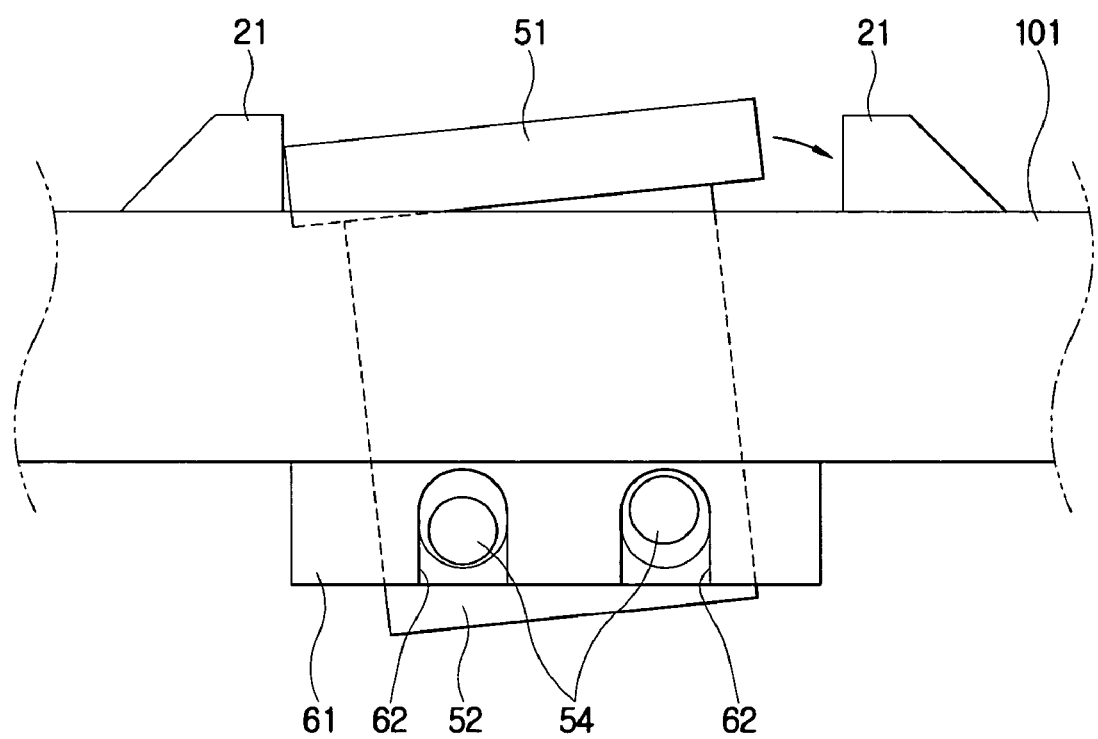
FIGS. 16A and 16B show how side supporters shown in FIG. 14 are moved in a transverse direction.
Figure 16B:
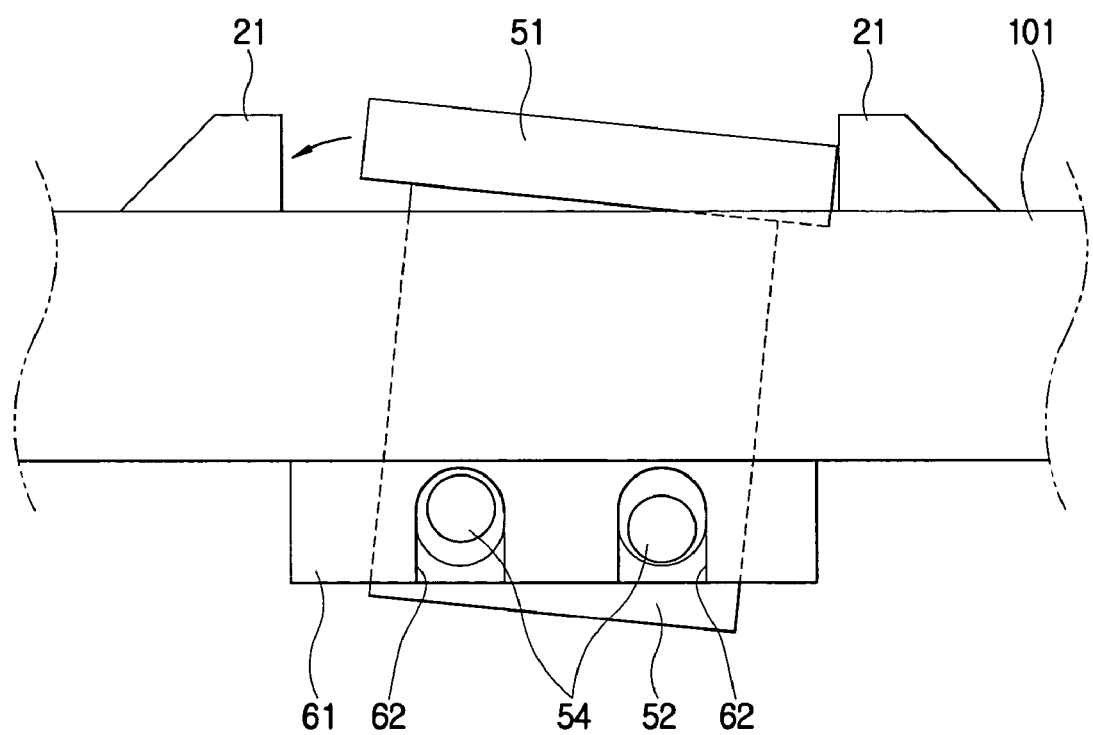

The right and left side supporters 50 and 50*a* are connected with the first, second and third anchoring parts 61, 63 and 65 by the pins 54. Thus, the right and left side supporters 50 and 50*a* are movable about the pins 54 in a vertical direction as shown in FIGS. 15A and 15B, also in a traverse direction as shown in FIGS. 16A and 16B. Further, the structure in which the right and left side supporters 50 and 50*a* are movable may be applied to the portable computer according to the second embodiment of the present invention.

A locking member according to a fourth embodiment in which the locking member is applied to a portable computer different from that in the above-described embodiments is described.

Figure 17:
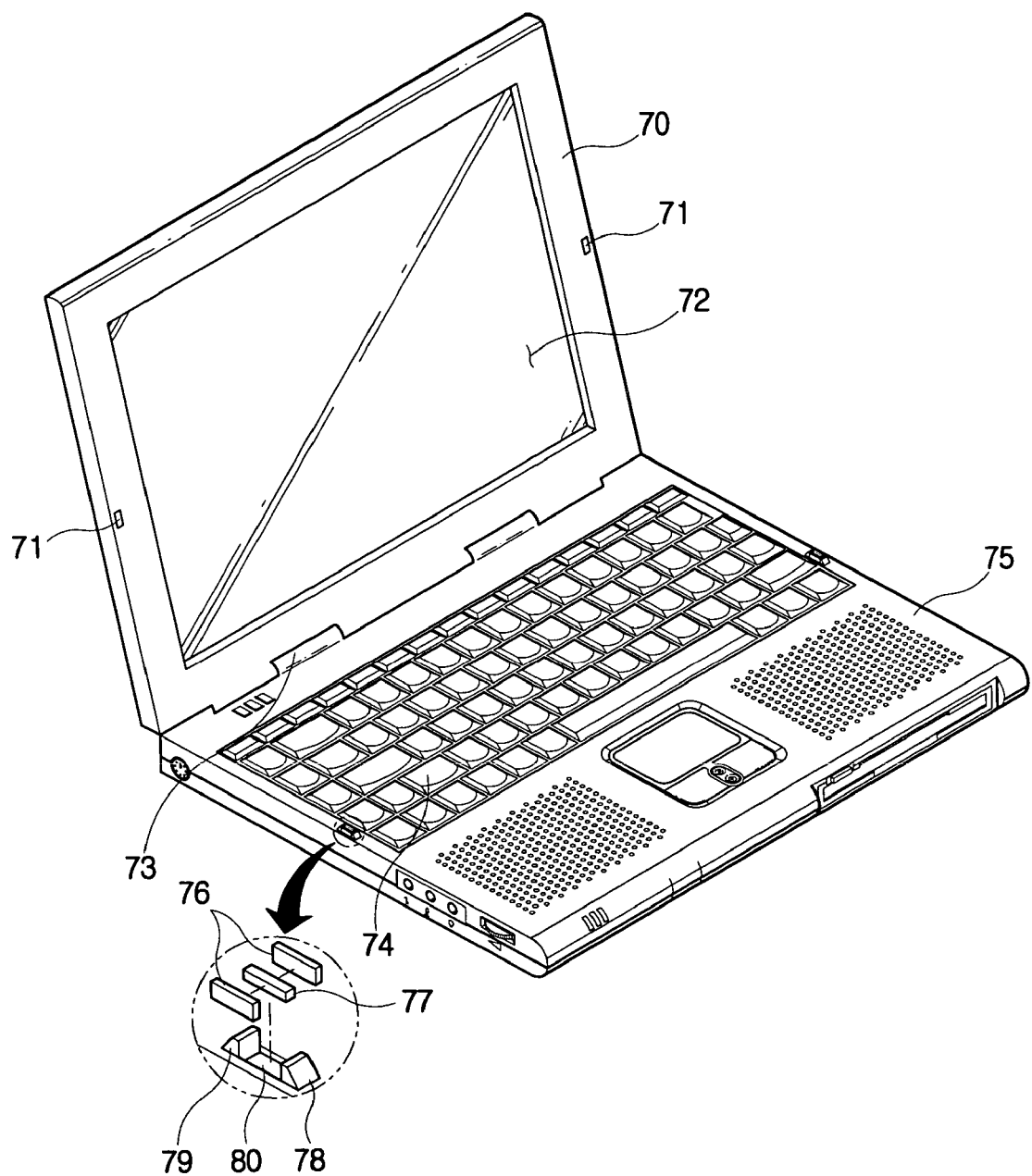
FIGS. 17 and 18 are perspective views of a portable computer according to a fourth embodiment of the present invention.
Figure 18:
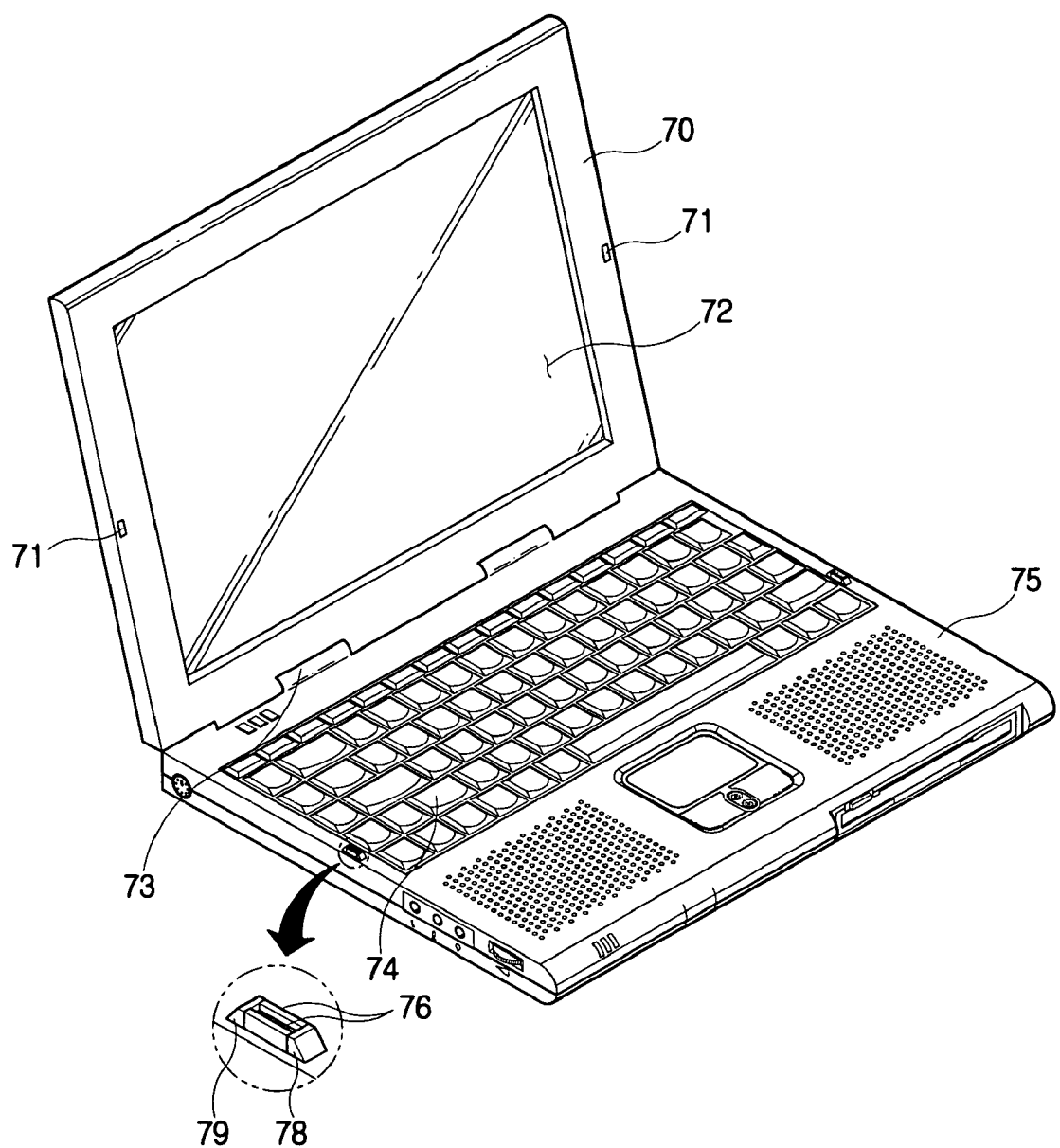

As shown in FIGS. 17 and 18, the portable computer according to the fourth embodiment comprises a computer main body 75, a display 70 having an LCD panel 72 on a front surface to be rotatably connected to the computer main body 75 and a hinge 73 supporting the display 70 to be rotated relative to the computer main body 75. While described in terms of the LCD, it should understood that other types of displays can be used, including but not limited to, plasma display panels (PDPs), cathode ray tubes (CRTs), flat panel displays, and other such devices.

The portable computer according to the fourth embodiment further comprises the locking member preventing the display 70 from being unintentionally rotated, when the display is adjusted to a folded position in which a front surface of the display 70 is substantially parallel with and in contact with the computer main body 75.

The locking member comprises a metal member 71 provided on a front surface of the display 70, a magnet 77 provided on an upper surface of the computer main body 75 including a keyboard 74 and an accommodating part 80 to accommodate the magnet 77.

As shown in FIG. 17, the accommodating part 80 is grooved from the upper surface of the computer main body 101 to form an upper opening, which forms an accommodating space for the magnet 77.

A pair of side supporters 76 is mounted on opposite sides of the accommodating part 80 with a predetermined space therebetween. A front supporter 78 and a rear supporter 79 are mounted on the front and rear of the accommodating part 80 with a predetermined space therebetween.

The pair of side supporters 76 is shaped of a plate having a height higher than the side height of the magnet 77. Thus, the pair of side supporter 30 can completely cover side surfaces of the magnet 31, so that the sides of the magnet 77 cannot be seen from the outside.

Between the pair of side supporters 76 is the magnet 77 introduced, which supports the opposite sides of the magnet 77.

The front and rear supporters 78 and 79 protrude upwardly from an upper surface of the computer main body 75. Between the front and rear supporters 78 and 79 is the magnet 77 introduced, which supports the front and rear of the magnet 77.

In the fourth embodiment shown in FIGS. 17 and 18, the metal member 71 is provided on the front surface of the display 70 and the magnet 77 is provided on the upper surface of the computer main body 75 including the keyboard 74. It is understood that the metal member 71 may be provided on the upper surface of the computer main body including the keyboard and the magnet 77 may be provided on the front surface of the display.

Figure 19:
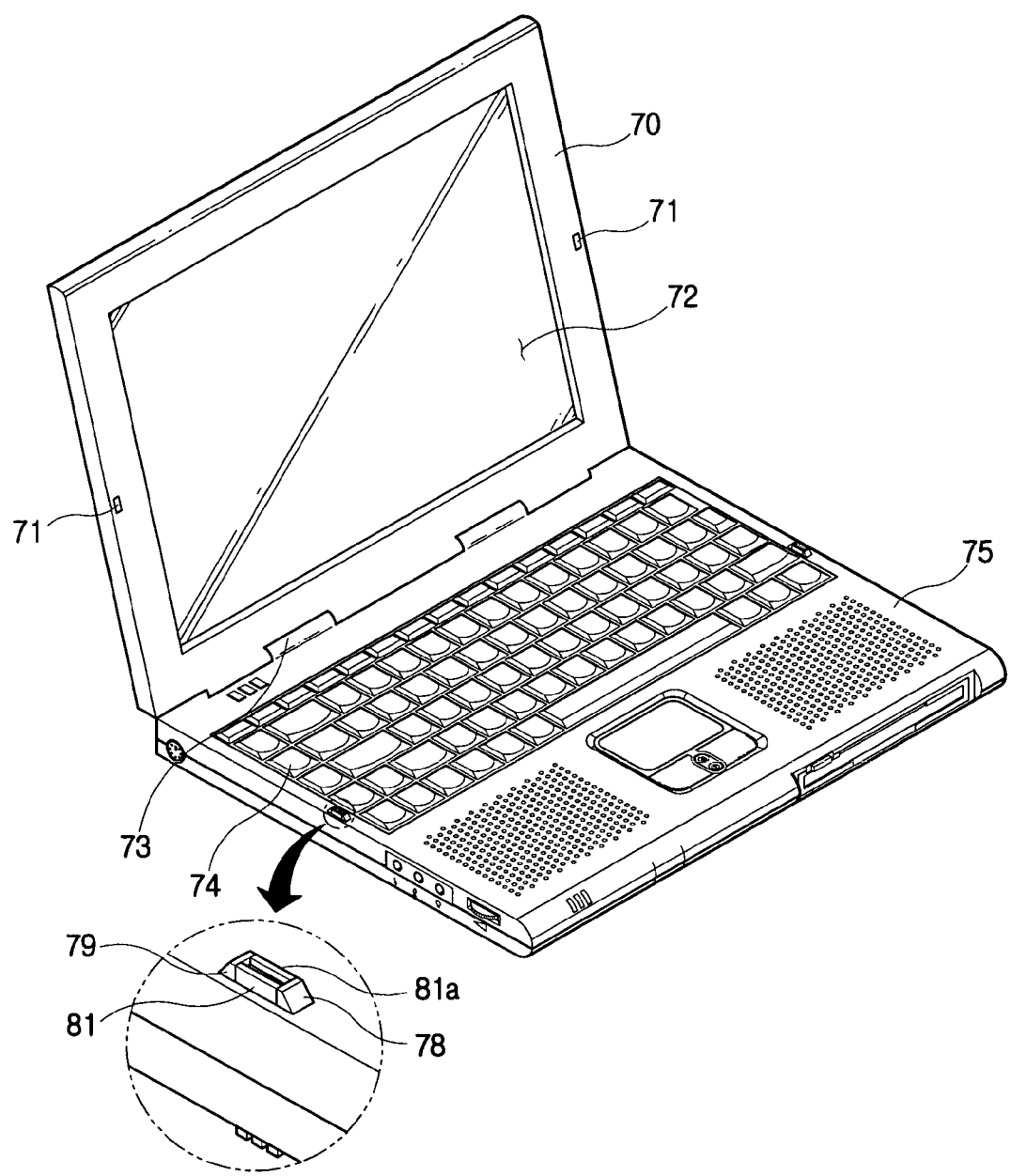
FIG. 19 is a perspective view of a portable computer according to a fifth embodiment of the present invention.
Figure 20:
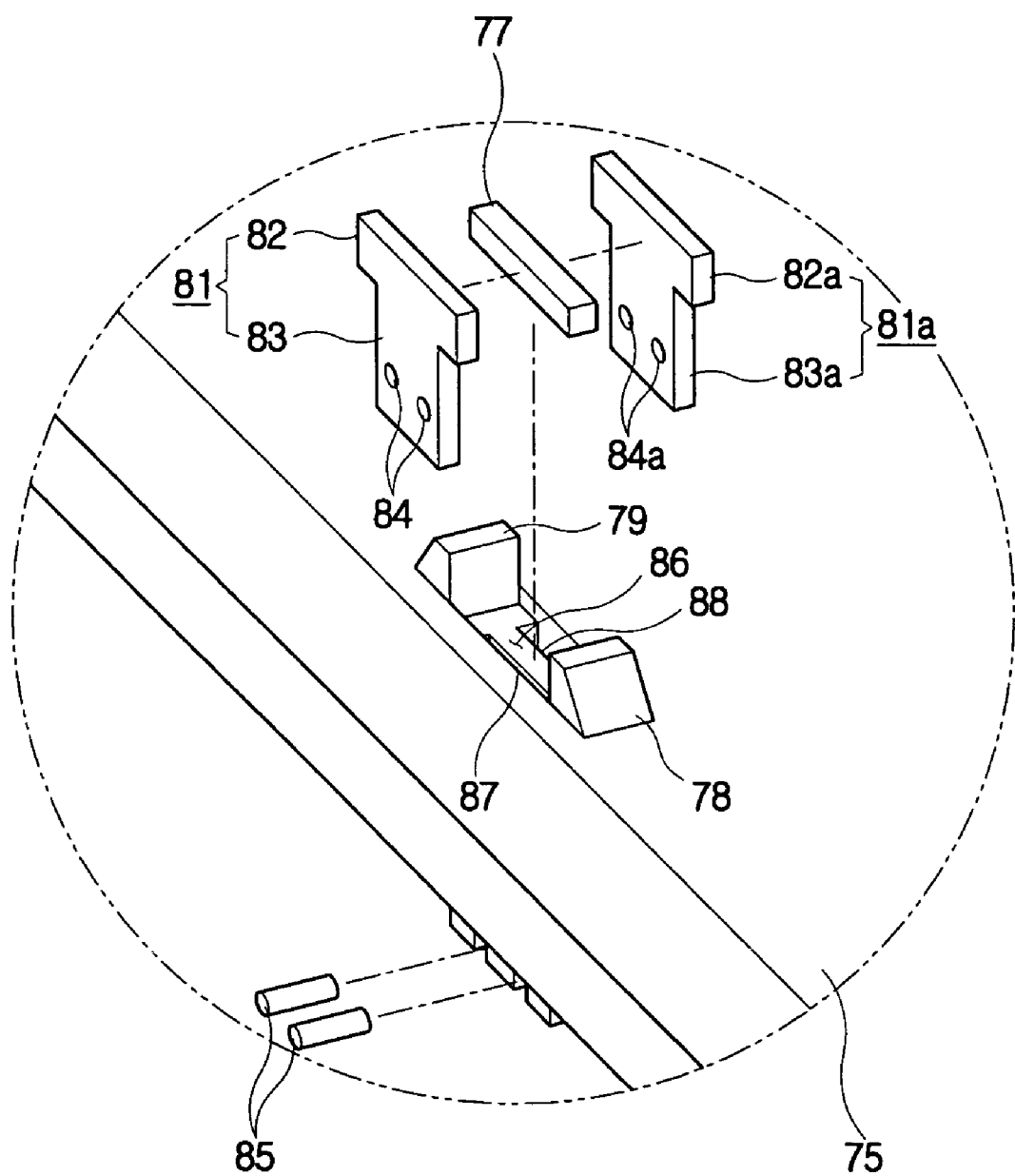
FIGS. 20 and 21 are enlarged perspective views of a locking member shown in FIG. 19.
Figure 21:
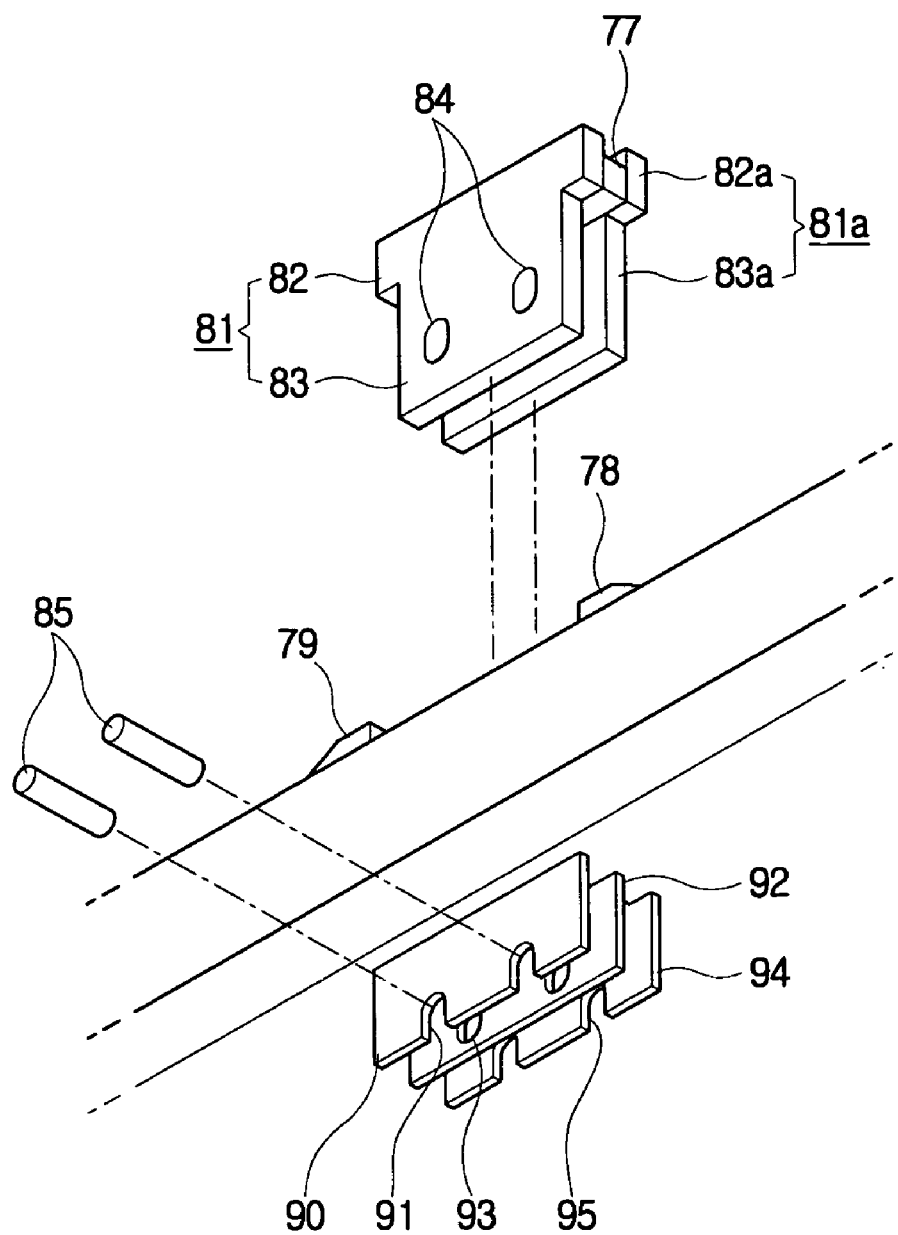

Further, the present invention provides a fifth embodiment shown in FIGS. 19 through 21 in which a pair of side supporters do not have a rectangular shape. As shown in FIG. 20, a left side supporter 81 and a right side supporter 81*a* are mounted in opposite sides of an accommodating part 86.

The right side supporter 81 comprises a right side supporting part 82 that is in contact with a side of the magnet 77 to support the magnet 77 and a right side connecting part 83 having the width shorter than that of the right side supporting part 82 and extending downwardly from the right side supporting part 82.

The left side supporter 81*a* comprises a left side supporting part 82*a* having the same shape of the right side supporting part 82 and being in contact with the other side of the magnet 77 to support the magnet 77 and a left side connecting part 83*a* having the width shorter than that of the left side supporting part 82*a* and extending downwardly from the left side supporting part 82*a*.

The right side connecting part 83 is formed with a pair of right side connecting part holes 84 on a surface thereof. The left side connecting part 83*a* is formed with a pair of left side connecting part holes 84*a* aligned with the right side connecting part holes 84 on a surface thereof. A pair of pins 85 is inserted in the right and left side connecting part holes 84 and 84*a*.

The right side connecting part 83 of the right side supporter 81 is inserted into a first inserting groove 87 (to be described later) and then interposed between first and second anchoring parts 90 and 92 (to be described later). The left side connecting part 83*a* of the left side connecting part 81*a* is inserted into a second inserting groove 88 (to be described later) and then interposed between second and third anchoring parts 92 and 94 (to be described later).

As shown in FIG. 20, the accommodating part 86 formed with the first and second inserting grooves 87 and 88 that are apart from each other and pass through the computer main body 75 to be in communication with an interior of the accommodating part 86. At a lower part of the computer main body 75 are formed the first, second and third anchoring parts 90, 92 and 94 aligned with one another in the accommodating part 86 and to be connected with the right side connecting part 83 and the left side connecting part 83*a*, respectively, when the right side connecting part 83 is inserted in the first inserting groove 87 and the left side connecting part 83*a* is inserted in the second inserting groove 88.

As shown in FIG. 21, each of the first, second and third anchoring parts 90, 92 and 94 is placed apart from one another using a predetermined space in a lower part of the computer main body 75. The right side connecting part 83 of the right side supporter 81 is inserted in the first inserting groove 87 and interposed between the first and second anchoring parts 90 and 92. The left side connecting part 83*a* of the left side supporter 81*a* is inserted in the second inserting groove 88 and interposed between the second and third anchoring parts 92 and 94.

The first, second and third anchoring parts 90, 92 and 94 are formed with a first, second and third anchoring part hole 91, 93 and 95, respectively, aligned with the right side connecting part hole 84 and the left side connecting part hole 84*a*, which allows the pins 85 to be inserted into surfaces of the first, second and third anchoring parts 90, 92 and 94 in a traverse direction thereof. Thus, the pins 85 are sequentially inserted in the first anchoring part hole 91, the right side connecting part hole 84, the second anchoring part hole 93, the left side connecting part hole 84*a* and the third anchoring part hole 95.

In the fourth embodiment described above (refer to FIGS. 17 and 18), the pair of side supporters 76 is securely inserted in the accommodating part 80, so that the pair of side supporters 76 is unmovable. In contrast thereto, in the fifth embodiment, the right and left side supporters 81 and 81a are movably mounted, which provides a convenience to interpose the magnet 77 between the right and left side supporters 81 and 81a.

In the fifth embodiment shown in FIGS. 19 through 21, the metal member 71 is provided on the front surface of the display 70 and the magnet 77 is mounted on the upper surface of the computer main body 75 having the keyboard 74. However, the metal member may be provided on the upper surface of the computer main body having the keyboard and the magnet is provided on the front surface of the display.

As described above, the present invention provides the portable computer in which the locking member can be operated without an additional operating means, thereby being convenient to open and close the display about the computer main body.

Although a few embodiments of the present invention have been shown and described, it will be appreciated by those skilled in the art that changes may be made in these embodiments without departing from the principles and spirit of the invention, the scope of which is defined in the accompanying claims and their equivalents.

What is claimed is:

1. A portable computer comprising:
   a main body having a processing unit;
   a display comprising a display housing including a display surface on which information is displayed according to the processing unit;
   a link connecting the main body and the display, the display surface being able to be rotated to be substantially parallel with and facing the main body in a first position, to be substantially parallel with and facing away from the main body in a second position, and to be substantially non-parallel with the main body in a third position; and
   a locking member for preventing the display from unintentionally being rotated in the first position or in the second position, the locking member comprising a first metal member mounted on a front surface of the display, a second metal member mounted on a rear surface of the display, a magnet provided on an upper surface of the main body for attachment to the first metal member by the magnetic force when in the first position and for attachment to the second metal member by the magnetic force when in the second position, and a pair of side supporters for supporting opposite sides of the magnet, wherein the upper surface of the main body is a surface that is substantially parallel with and facing the front surface of the display in the first position and is substantially parallel with and facing the rear surface of the display in the second position, wherein at least one of the magnet and the pair of side supporters extends from the upper surface of the main body with the pair of side supporters extending further than the magnet.

2. The portable computer according to claim 1, wherein the link comprises a first element connected to the main body in the first position, and a pair of second elements rotatably connected to the first element and rotatably connected to the display housing in the second position.

3. The portable computer according to claim 1, further comprising:
   an accommodating part grooved from the upper surface of the main body to accommodate the magnet;
   a front supporter for supporting the front of the magnet; and
   a rear supporter for supporting the rear of the magnet.

4. The portable computer according to claim 3, further comprising a connector for connecting the pair of side supporters to the main body to allow the pair of side supporters to move relative to the accommodating part.

5. The portable computer according to claim 4, wherein the pair of side supporters comprise:
   a first side supporter comprising:
   a first side supporting part provided at a first side of the magnet and contacting the magnet; and
   a first side connecting part having the width shorter than that of the first side supporting part and extending downwardly from the first side supporting part; and
   a second side supporter comprising:
   a second side supporting part provided at a second side of the magnet and contacting the magnet; and
   a second side connecting part having the width shorter than that of the second side supporting part and extending downwardly from the second side supporting part.

6. The portable computer according to claim 5, wherein the accommodating part is formed with a first inserting groove in which the first side connecting part is inserted to be in communication with the main body and a second inserting groove in which the second side connecting part is inserted to be in communication with the main body.

7. The portable computer according to claim 6, further comprising:
   first, second, and third anchoring parts aligned with one another in the accommodating part and placed in a lower part of the main body with a predetermined space therebetween,
   the first connecting part inserted in the second inserting groove being interposed between the second and third anchoring parts and the second connecting part inserted in the first inserting groove being interposed between the second and third anchoring parts.

8. The portable computer according to claim 7, the connector further comprising:
   first, second and third anchoring part holes passing through the first, second, and third anchoring parts, respectively;
   first and second side connecting part holes passing through the first and second connecting parts, respectively; and
   pins inserted in the first, second and third anchoring part holes and first and second side connecting part holes.

9. A portable computer comprising:
   a main body having a processing unit;
   a display comprising a display housing including a display surface on which information is displayed according to the processing unit;
   a link for connecting the main body and the display, the display surface being able to be rotated to be substantially parallel with and facing the main body in a first position, to be substantially parallel with and facing away from the main body in a second position, and to be substantially non-parallel with the main body in a third position; and
   a locking member for preventing the display from unintentionally being rotated in the first position and in the second position, the locking member comprising a first magnet mounted on a front surface of the display, a second magnet mounted on a rear surface of the display, a metal member provided on the main body to be attached to the first magnet by the magnetic force of the magnet in the first position and to be attached to the second magnet by the magnetic force of the magnet in the second position, a first pair of side supporters for supporting opposite sides of the first magnet, and a second pair of side supporters for supporting opposite sides of the second magnet, wherein at least one of the first magnet and the first pair of side supporters extends from the front surface of the display with the first pair of side supporters extending further than the first magnet, and at least one of the second magnet and the second pair of side supporters extends from the rear surface of the display with the second pair of side supporters extending further than the second magnet.

10. The portable computer according to claim 9, further comprising:
- a first accommodating part grooved from the front surface of the display to accommodate the first magnet;
- a first front supporter for supporting the front of the first magnet;
- a first rear supporter for supporting the rear of the first magnet;
- a second accommodating part grooved from a rear surface of the display to accommodate the second magnet;
- a second front supporter for supporting the front of the second magnet; and
- a second rear supporter for supporting the rear of the second magnet.

11. A portable computer comprising:
- a main body;
- a display rotatably connected with the main body; and
- a locking member for preventing the display from unintentionally being rotated in a folded position in which a front surface of the display is substantially parallel with and in contact with an upper surface of the main body, the locking member comprising a metal member provided at one of the display and the main body, a magnet provided at the other one of the display and the main body for attachment to the metal member due to the magnetic force, and a pair of side supporters for supporting opposite sides of the magnet, wherein at least one of the magnet and the pair of side supporters extends from the front surface of the display or the upper surface of the main body with the pair of side supporters extending further than the magnet.

12. The portable computer according to claim 11, wherein the metal member is mounted on a front surface of the display and the magnet is provided on the upper surface of the main body.

13. The portable computer according to claim 12, further comprising:
- an accommodating part grooved from the upper surface of the main body to accommodate the magnet;
- a front supporter for supporting the front of the magnet; and
- a rear supporter for supporting the rear of the magnet.

14. The portable computer according to claim 13, further comprising a connector for connecting the pair of side supporters to the main body to enable the pair of side supporters to be rotatable relative to the accommodating part.

15. The portable computer according to claim 14, wherein the pair of side supporters comprise:
- a first side supporter comprising:
  - a first side supporting part provided at a first side of the magnet and contacting the magnet;
  - a first side connecting part having the width shorter than that of the first side supporting part and extending downwardly from the first side supporting part;
- a second side supporter comprising:
  - a second side supporting part provided at a second side of the magnet and contacting the magnet; and
  - a second side connecting part having the width shorter than that of the second side supporting part and extending downwardly from the second side supporting part.

16. The portable computer according to claim 15, wherein the accommodating part is formed with a first inserting groove in which the first side connecting part is inserted to be in communication with the main body and a second inserting groove in which the second side connecting part is inserted to be in communication with the main body.

17. The portable computer according to claim 16, further comprising:
- first, second, and third anchoring parts aligned with one another in the accommodating parts and placed in a lower part of the main body with a predetermined space therebetween,
- the first connecting part inserted in the second inserting groove being interposed between the second and third anchoring parts and the second connecting part inserted in the first inserting groove being interposed between the second and third anchoring parts.

18. The portable computer according to claim 17, wherein the connector further comprises:
- first, second and third anchoring part holes passing through the first, second, and third anchoring parts, respectively;
- first and second side connecting part holes passing through the first and second connecting parts, respectively; and
- pins inserted in the first, second and third anchoring part holes and first and second side connecting part holes.

* * * * *